United States Patent
Riley et al.

[11] Patent Number: 5,883,982
[45] Date of Patent: Mar. 16, 1999

[54] ASTIGMATISM MEASUREMENT APPARATUS AND METHOD BASED ON A FOCAL PLANE SEPARATION MEASUREMENT

[75] Inventors: James K. Riley, Redmond; Keith L. Frost, Seattle; William C. Lindow, Kent; Kim J. Hansen, Renton; Tuan Phan, Lynwood; James A. Stephanick, Seattle, all of Wash.

[73] Assignee: NeoPath, Inc., Redmond, Wash.

[21] Appl. No.: 816,837

[22] Filed: Mar. 13, 1997

Related U.S. Application Data

[62] Division of Ser. No. 547,653, Oct. 24, 1995, Pat. No. 5,642,441.

[51] Int. Cl.$^6$ ............................................. G06K 9/36
[52] U.S. Cl. ................................. 382/255; 356/124
[58] Field of Search ................................. 382/100, 255, 382/312, 321; 348/345, 347, 349; 356/4.03, 4.04, 4.05, 123, 124, 124.5

[56] References Cited

U.S. PATENT DOCUMENTS

| | | | |
|---|---|---|---|
| 3,562,785 | 2/1971 | Craig | 250/204 |
| 4,070,115 | 1/1978 | Humphrey | 356/125 |
| 4,358,200 | 11/1982 | Heemskerk et al. | 356/123 |
| 4,609,287 | 9/1986 | Kohayakawa | 356/124 |
| 4,620,790 | 11/1986 | Hufnagel | 356/124 |
| 5,276,519 | 1/1994 | Richards et al. | 358/209 |
| 5,303,023 | 4/1994 | Portney et al. | 356/124.5 |
| 5,406,375 | 4/1995 | Brandstetter | 356/124 |

*Primary Examiner*—Andrew W. Johns
*Attorney, Agent, or Firm*—Hans I. Sun; Emil Moffa

[57] ABSTRACT

A computer receives image data from a star-shaped optical target in the object plane and calculates angle-dependent boundary sharpness. The horizontal, x-direction, amplitude derivative and the vertical, y-direction, amplitude derivative are computed over a portion of each star pattern image from a Z panning sequence. A microscope slide stage, carrying the target, is moved vertically from a level just below where the target is in focus to a level just above where the target is in focus. For each small increment of vertical motion, Z panning, an image of the star pattern is captured for analysis. Computations are performed on the differentiated images to search for evidence of elongation of the point spread function and variation with stage Z position of the angle of long axis of such an out-of-round point spread function. The presence of a distorted point spread function that varies along the optical axis indicates astigmatism.

51 Claims, 30 Drawing Sheets

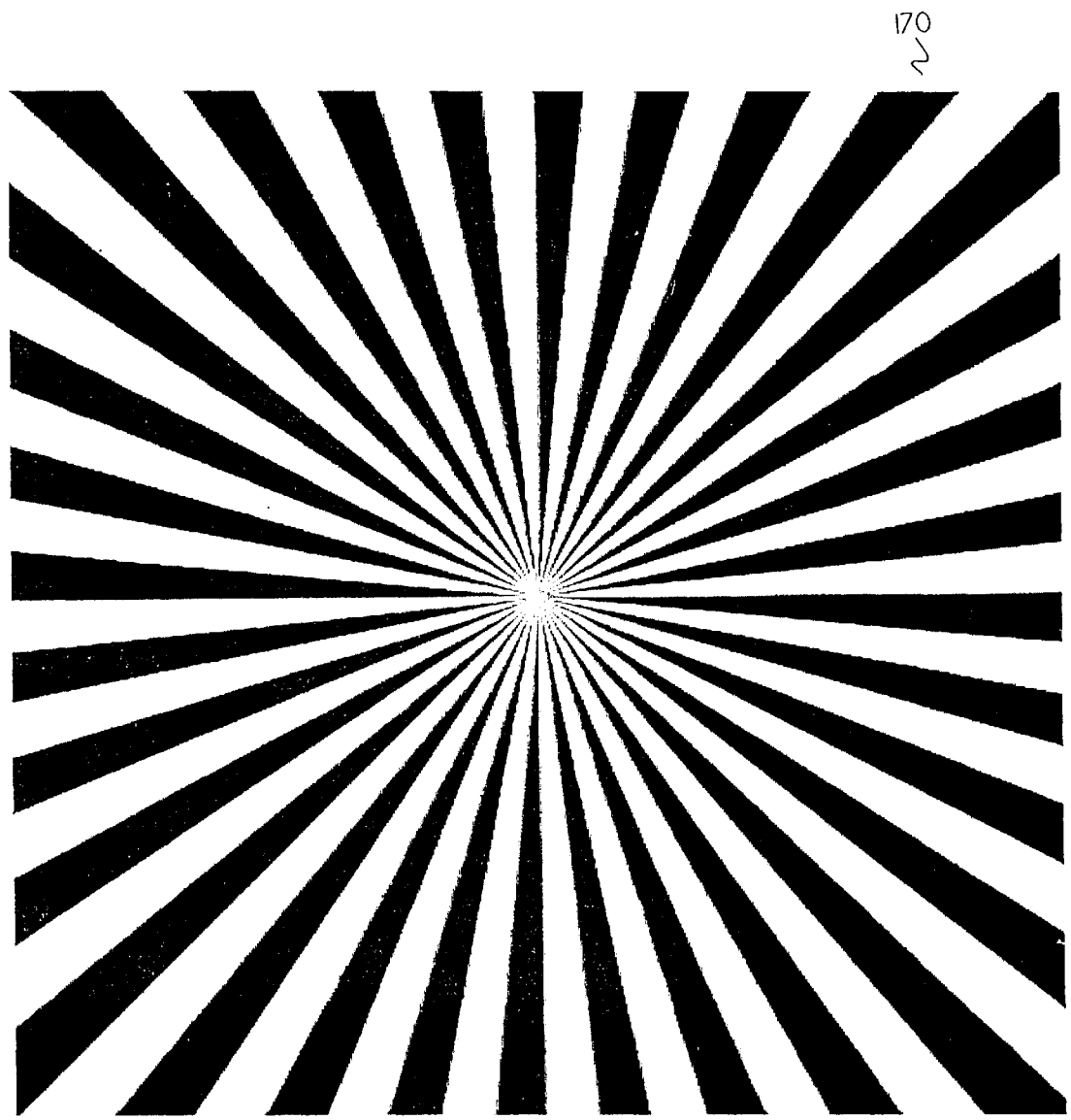
Fig_5B

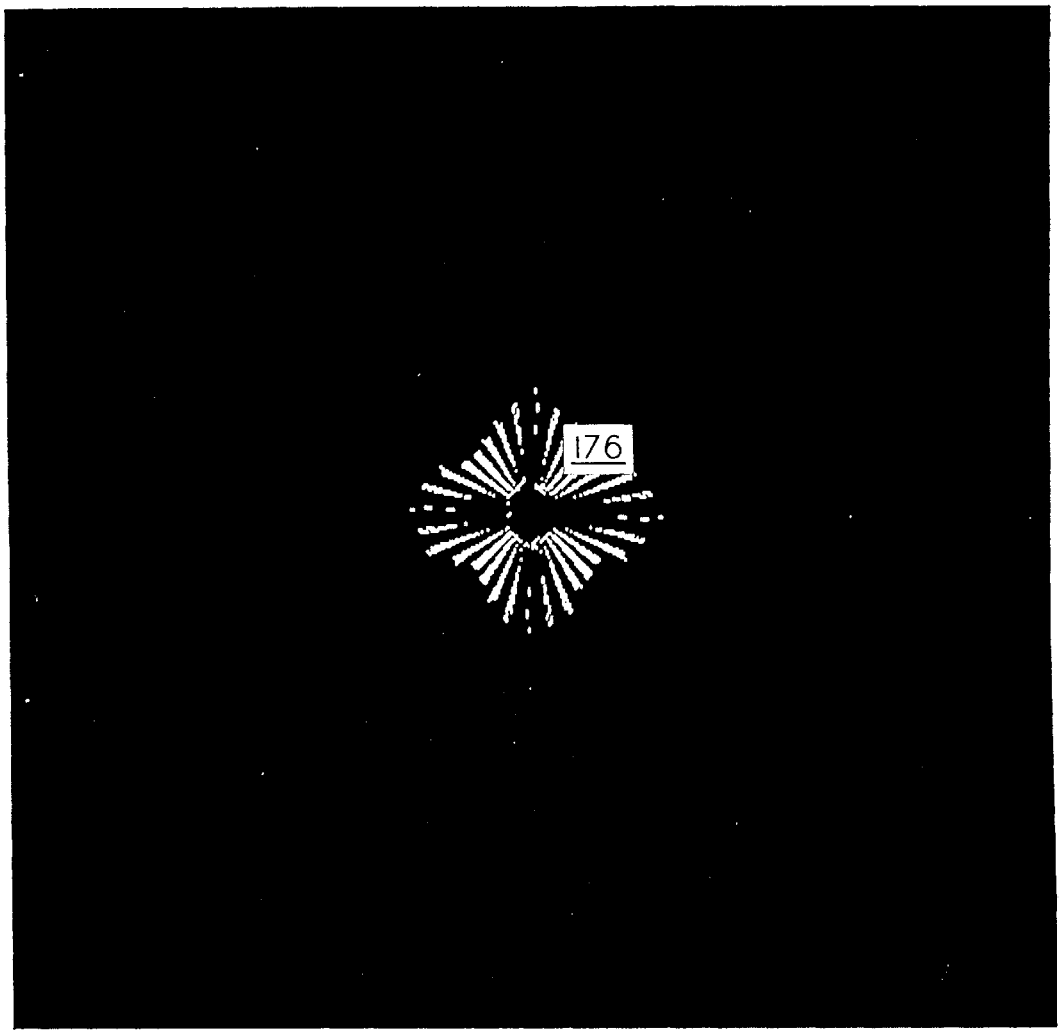
Fig_ 5E

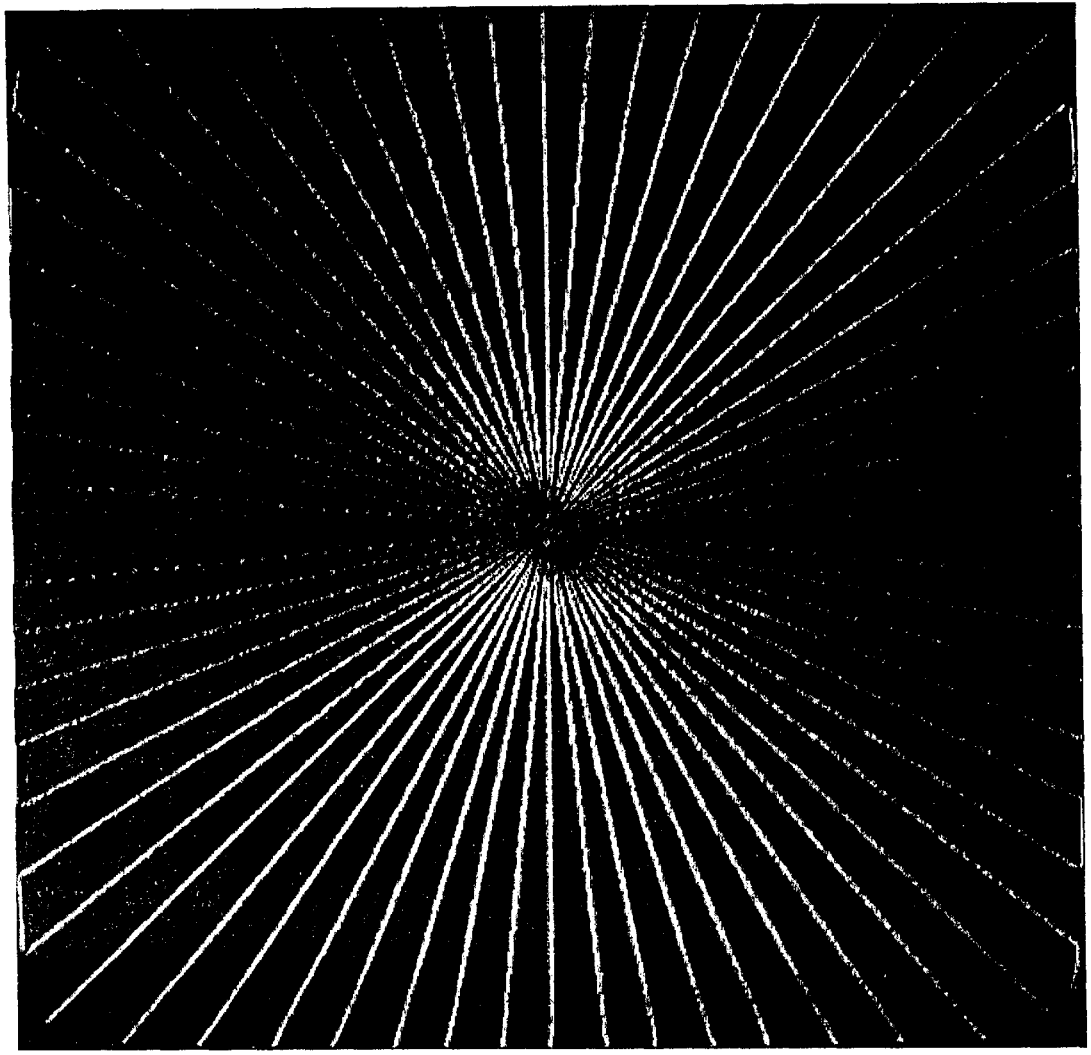
Fig_7B

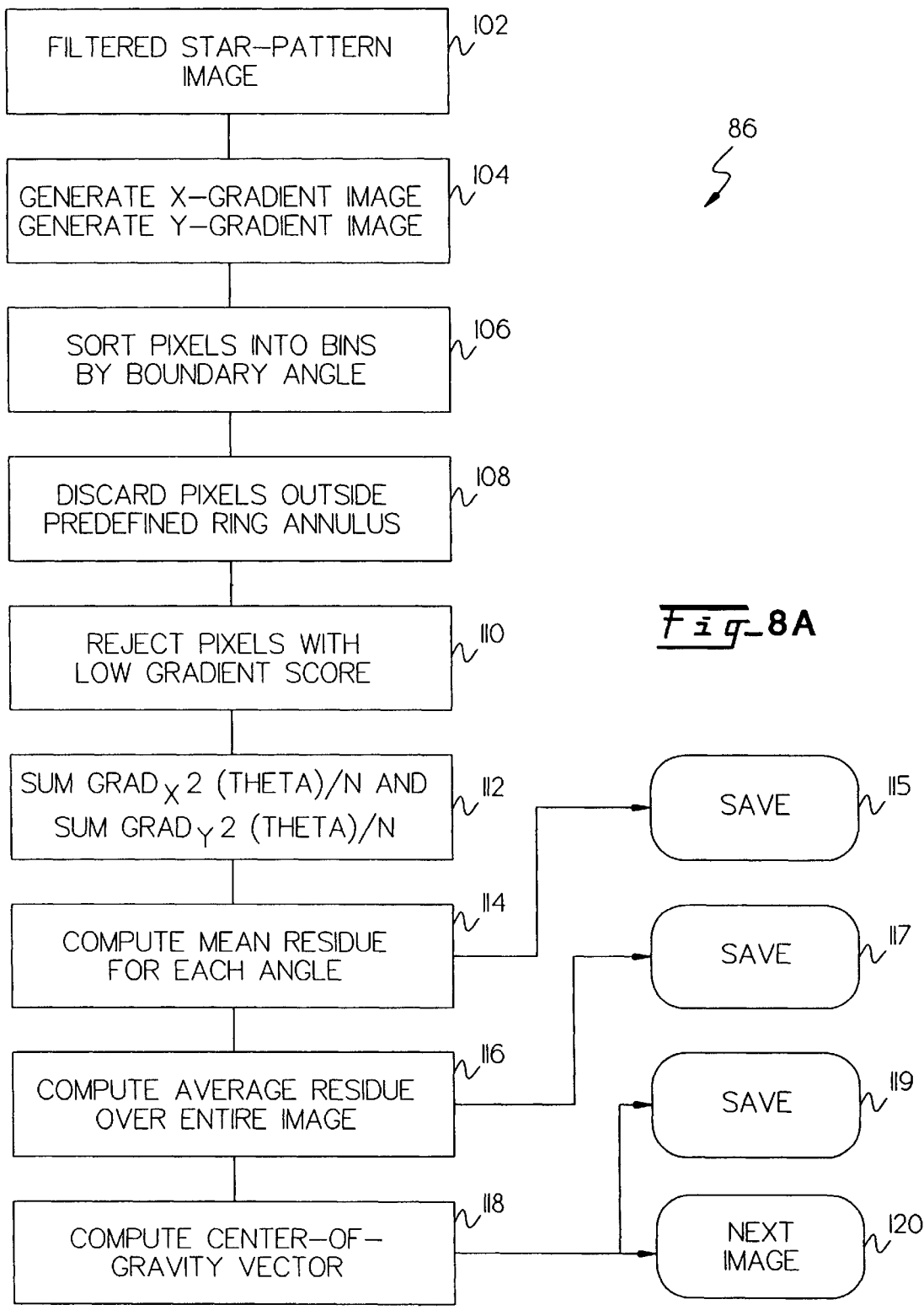

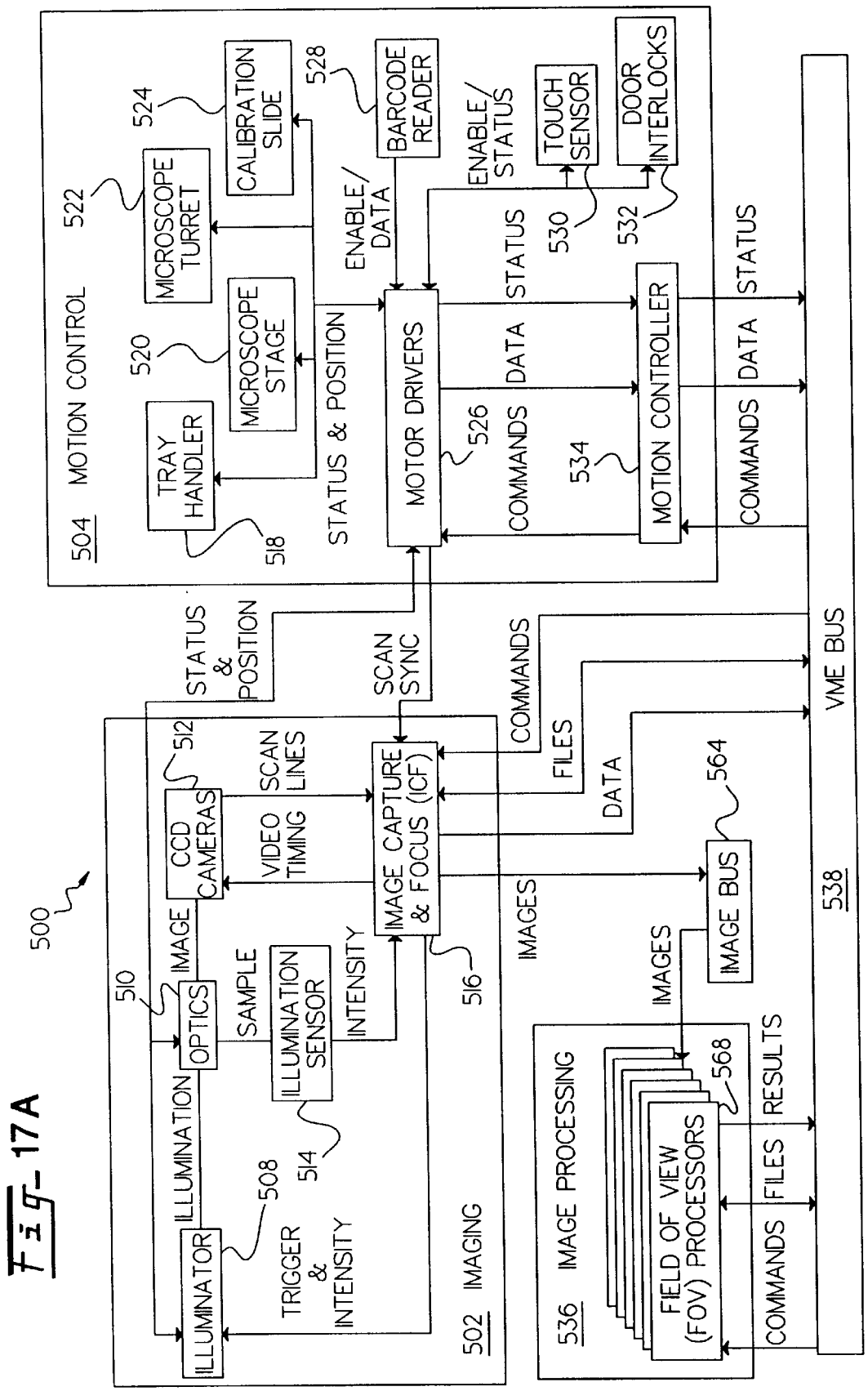

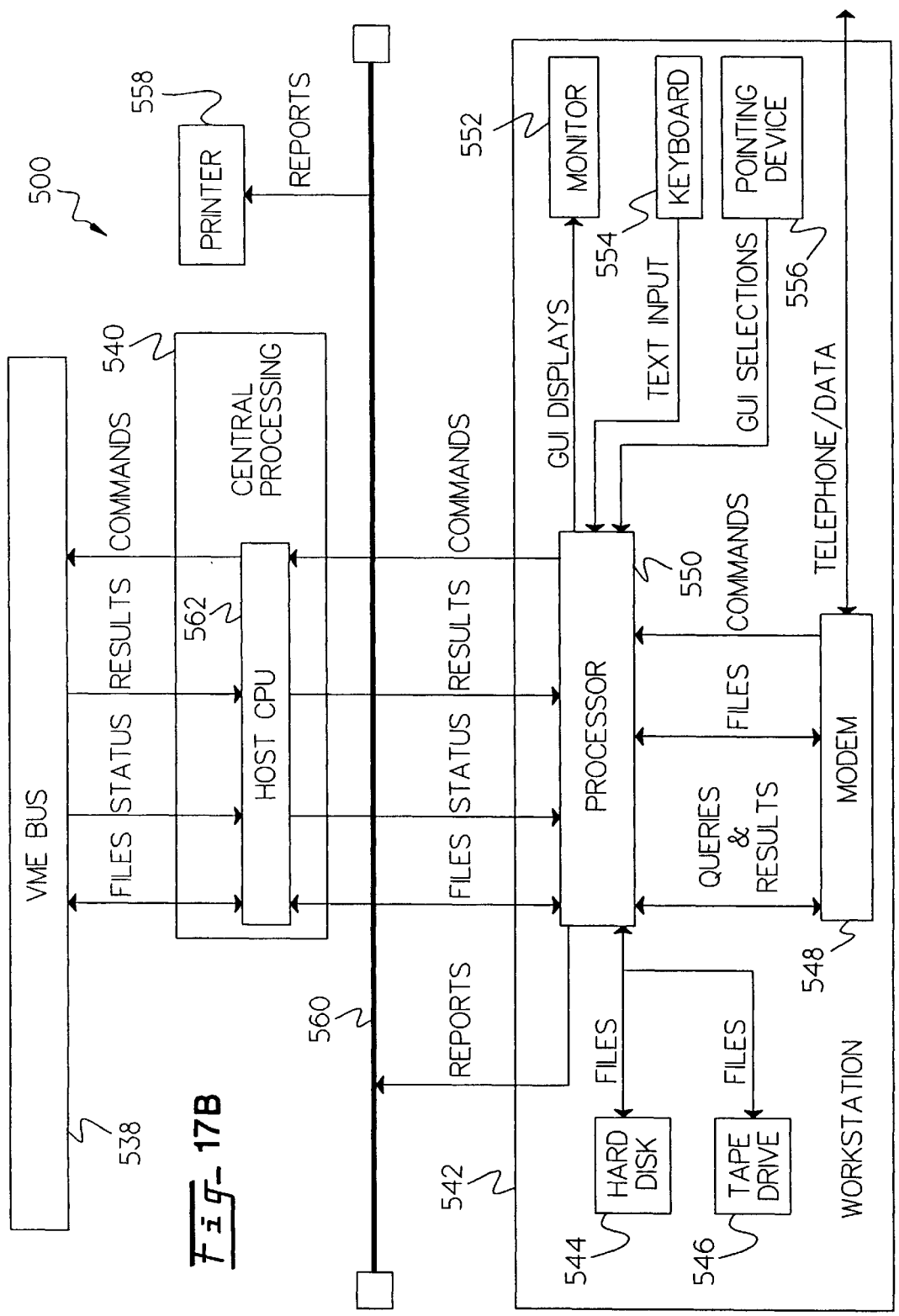

ASTIGMATISM MEASUREMENT APPARATUS AND METHOD BASED ON A FOCAL PLANE SEPARATION MEASUREMENT

This application is a division of application Ser. No. 08/547,653, filed Oct. 24, 1995, U.S. Pat. No. 5,642,441.

This invention relates to a method and apparatus to measure astigmatism in an optical path and more particularly to a method and apparatus that uses a computer based imaging system to measure focal plane separation as a measure of astigmatism.

BACKGROUND OF THE INVENTION

An ideal optical path, such as a system of lenses for a microscope, would provide undistorted magnification of features in the object with uniform resolution over an entire field of view. However, practical lenses, mirrors, and camera systems introduce aberrations that cause the image resolution to vary over the image plane. One such well known aberration is astigmatism. Astigmatism is defined as the presence of separate focal lengths, along the principal axis, for rays of light traveling in different rotational planes through the optics system. Optical paths of all types suffer from astigmatism.

A method is needed to measure the severity of this aberration so that optical paths that are excessively degraded by astigmatism can be repaired or adjusted. Therefore, the invention provides an automated system that measures astigmatism in an optical path and provides an optical quality signal to alert other system components that the optical path is so effected.

SUMMARY OF THE INVENTION

The invention provides a method for evaluating a condition of an optical system. The method of the invention acquires a plurality of images of a test pattern at different focus positions. The method of the invention then computes a plurality of center of gravity vectors, one center of gravity vector for each one of the plurality of images. The method of the invention then computes a focal plane separation from the plurality of center of gravity vectors and relates the condition of the optical system to the focal plane separation.

The invention provides an apparatus and method for the measurement of astigmatism in at least one optical element in an optical path. An optics mount holds the optical elements. An objective lens is disposed to receive an image from the optical path. An optical stage holds a test pattern in view of the objective lens wherein the objective lens receives an image of the test pattern. A stage drive is attached to move the optical stage, wherein the optical stage drive has a positional control input. A test pattern illuminator is disposed to illuminate the test pattern. A video camera views the test pattern image through the optical path and generates a video signal. Image acquisition electronics are connected to the video signal. The image acquisition electronics have a digital image output. An image analysis computer is connected to receive the digital image output and analyze the test pattern image to determine astigmatism in the optical path. A computer processor controls the stage drive.

In one embodiment, the apparatus of the invention further provides a control signal indicative of image degradation by astigmatism for instrument quality control.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

FIG. 5B shows a calibration plate test pattern.

FIG. 5E shows a diagonal erosion image.

FIG. 7B shows an X gradient test pattern image.

FIG. 8A shows an example of image analysis steps of the invention.

FIGS. 17A, 17B and 17C show a more detailed schematic of an astigmatism measuring apparatus employed by the invention.

DETAILED DESCRIPTION OF THE PREFERRED EMBODIMENT

Figure 1A:
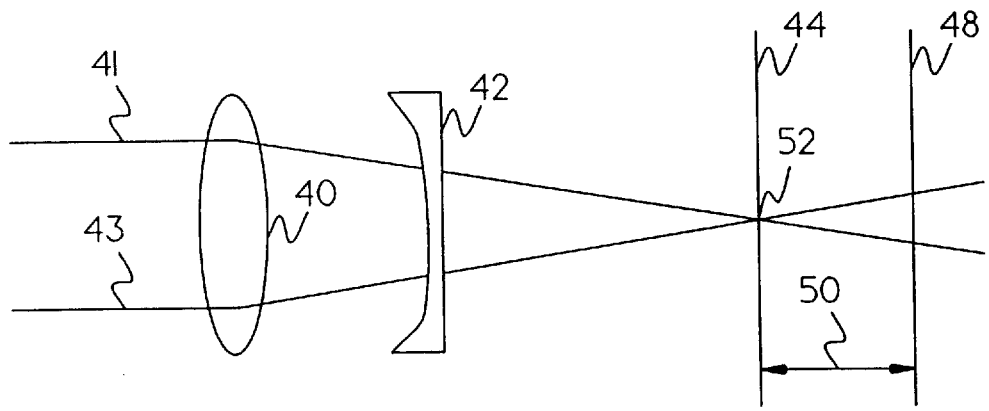
FIGS. 1A and 1B show an illustration of paraxial astigmatism in an optical path.
Figure 1B:
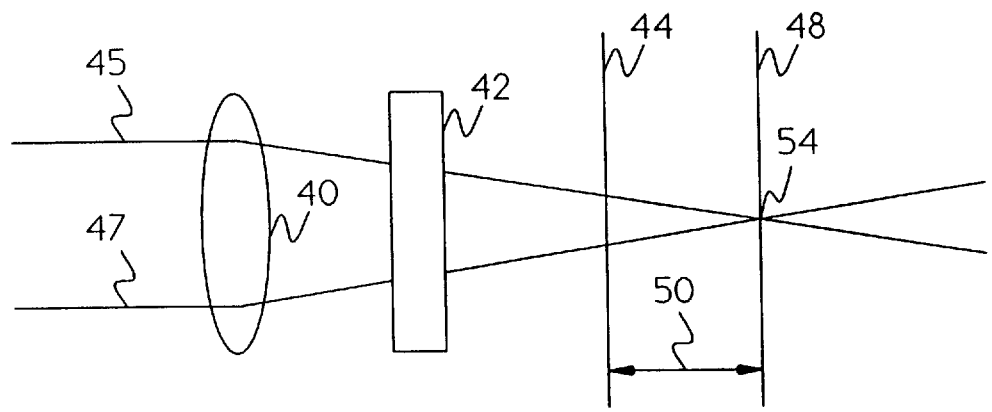

FIGS. 1A and 1B show an example of paraxial astigmatism. FIG. 1A shows an overhead view of an optical path wherein a lens 40 focuses light rays 41 and 43 through aberrating optical element 42 to focal point 52. Aberrating optical element 42 is shown in the XZ plane resulting in distortion in the XZ plane. Focal point 52 falls on focal plane 44. FIG. 1B shows a side view of the optical path of FIG. 1A wherein the lens 40 is focusing light rays 45 and 47 through aberrating optical element 42 to focal point 54. Aberrating optical element 42 is shown in the YZ plane in FIG. 1B. No distortion is present in the YZ plane. Focal point 54 falls on focal plane 48. A separation distance 50 between focal plane 44 and focal plane 48 is defined as the paraxial astigmatism.

Figure 2:
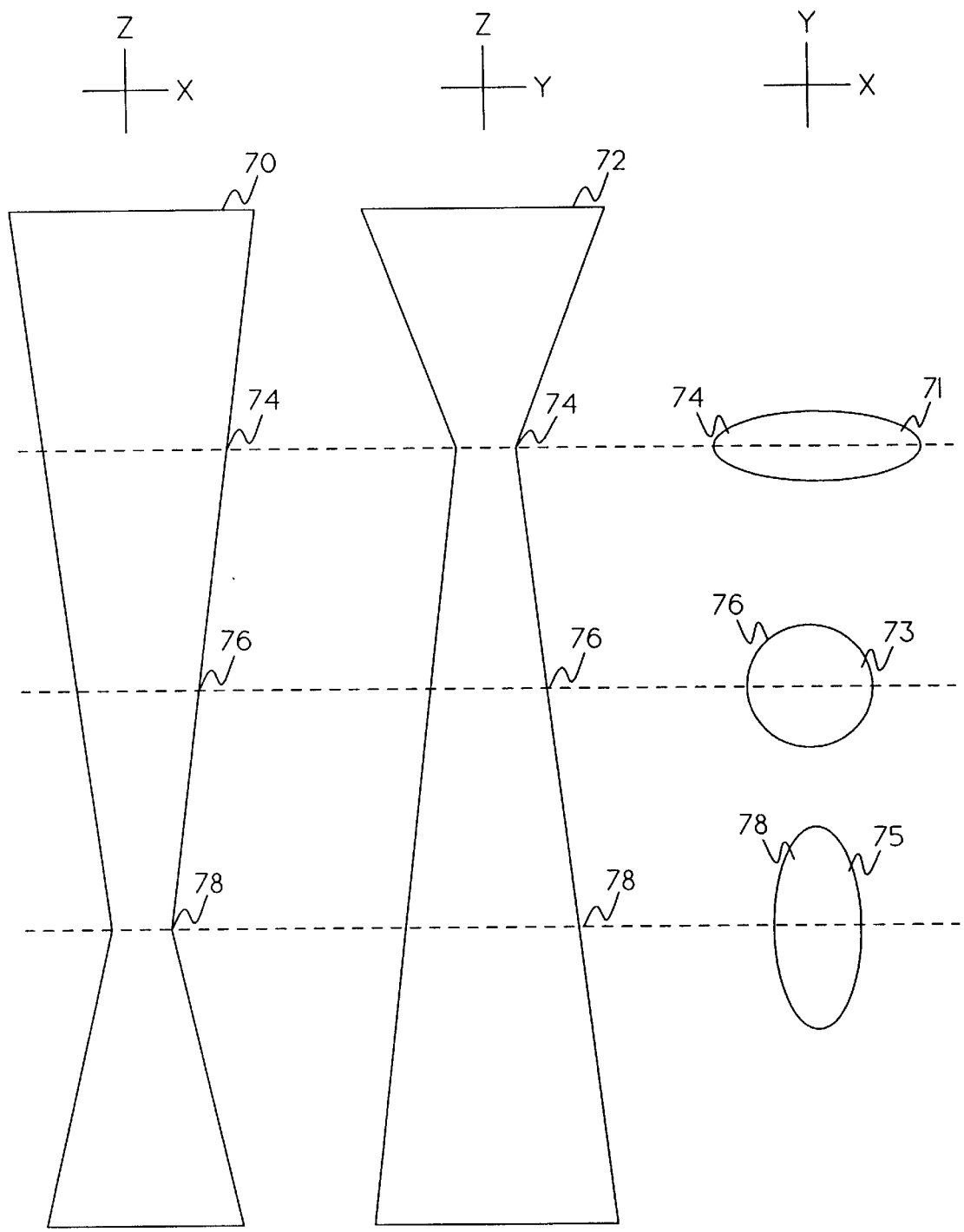
FIG. 2 shows an example of the effect of paraxial astigmatism on a point spread function.

FIG. 2 shows the effect of paraxial astigmatism on a point spread function of the optical system of FIGS. 1A and 1B. Outline 70 shows an overhead view of an XZ cross section of a point spread function of a typical optical path. Outline 72 shows a side view of the ZY cross section of the point spread function. Three example cross sections, where the cross sections are taken in the XY plane, are shown. Cross section 71, taken in plane 74, shows the plane of best focus for the ZY plane. Cross section 75, taken in plane 78, shows the plane of best focus for the ZX plane. The best focus plane for a given axis is defined as the plane where the point-spread function is the smallest. Astigmatism in the optical path is one cause of differing planes of best focus for different axes. As a result, there exists a plane where the point-spread functions for each axis, even though not at a minimum for either, creates a "plane of least confusion" 76. The plane of least confusion 76 is defined as the plane where the point spread function 73 is the same for both the ZX and ZY planes.

Figure 3:
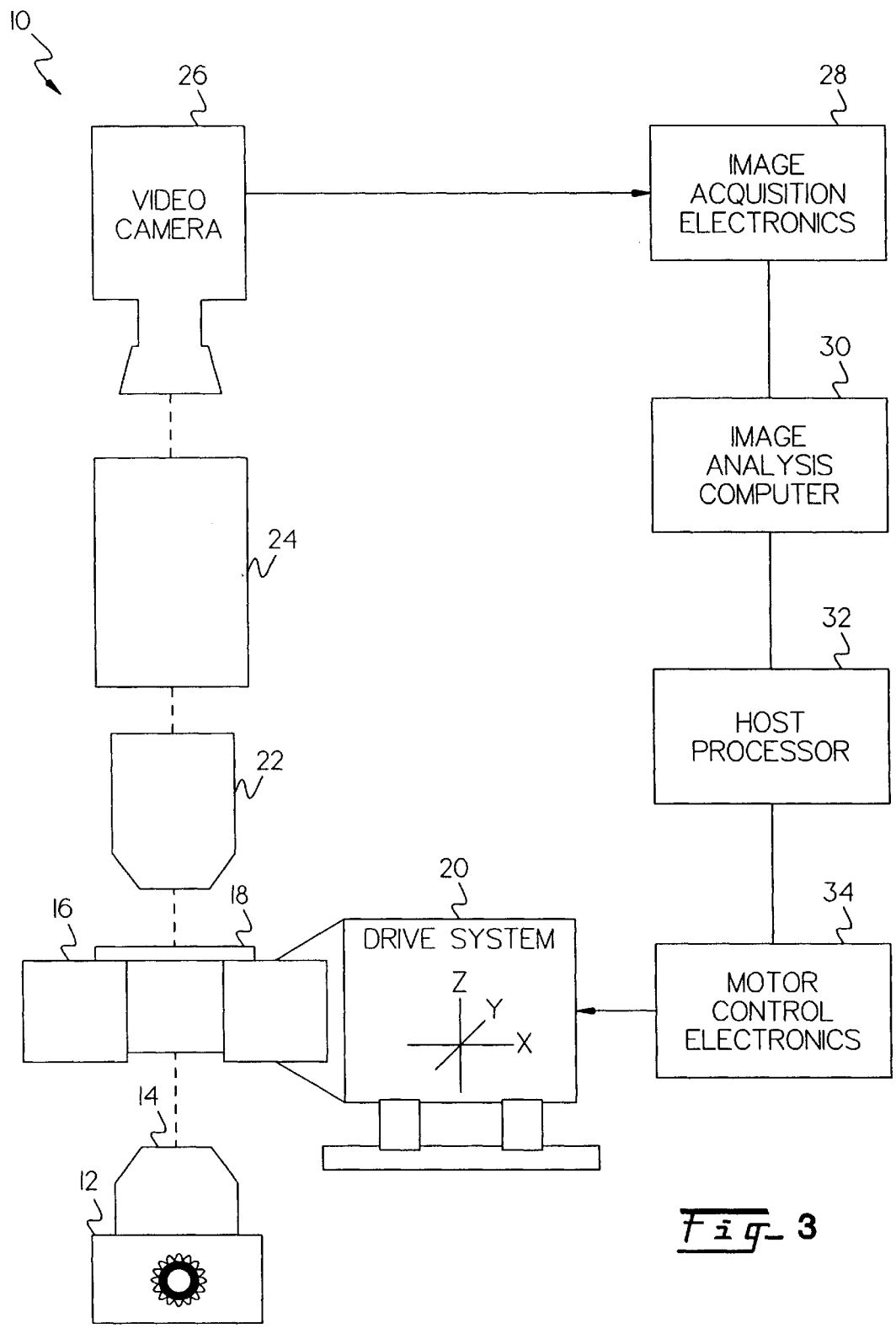
FIG. 3 shows an apparatus of the invention for testing an optical property of an optical path.

FIG. 3 shows a schematic diagram of one example of the astigmatism measurement apparatus of the invention. The optical path to be measured includes complex optical path 24 and objective 22. In one example embodiment the objective may comprise a 4× objective. Drive system 20 is connected to stage 16. Stage 16 holds a test pattern 18 illuminated by light source 12 through condenser 14. Objective 22 views test pattern 18 and sends light rays through complex optical path 24. Video camera 26, connected to image acquisition electronics 28, receives the light rays and converts them into electronic signals for processing by an image analysis computer 30. The image analysis computer 30 is connected to image acquisition electronics 28. Host processor 32 controls motor control electronics 34 that control the drive system 20.

Figure 4:
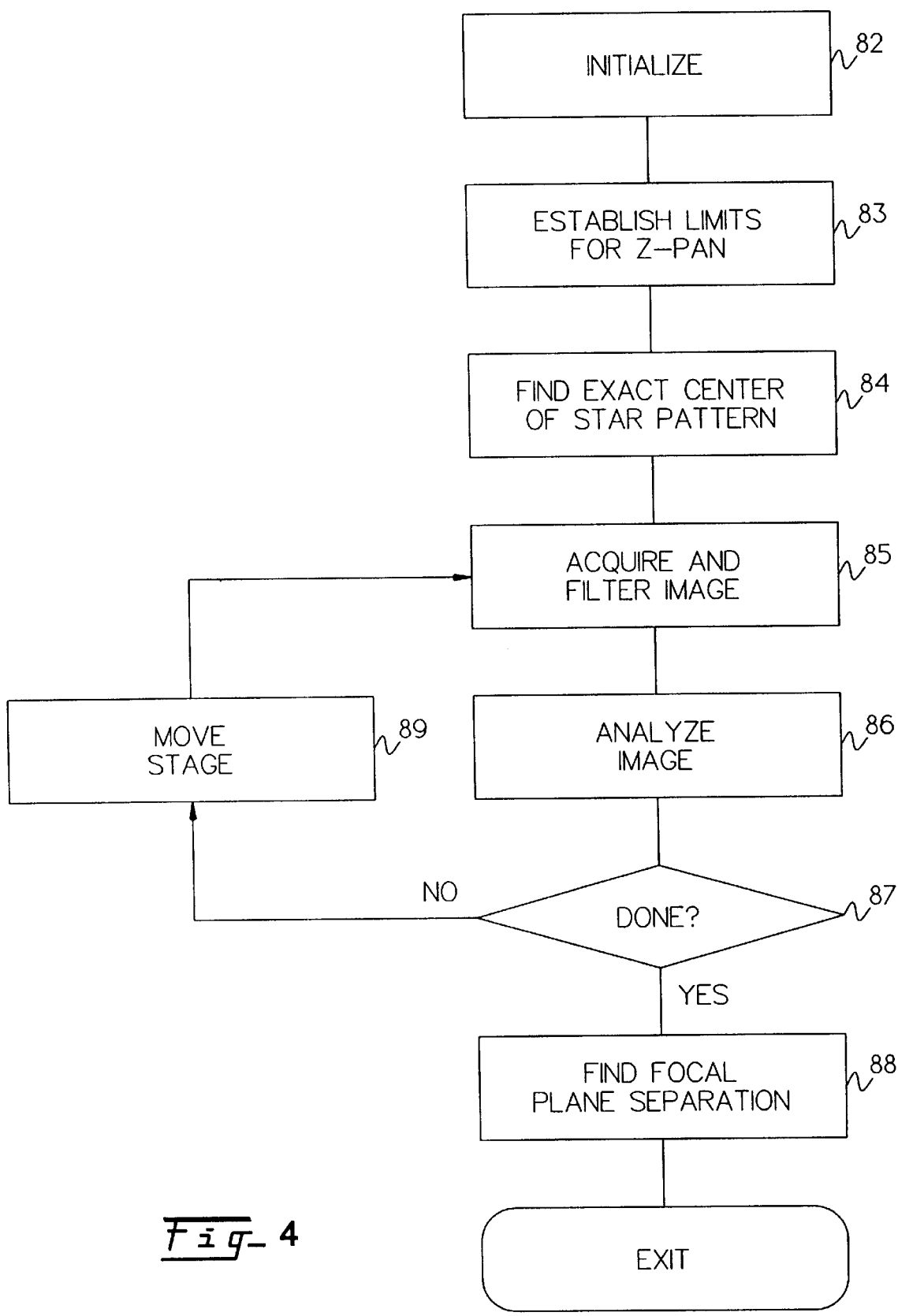
FIG. 4 shows one method of the invention to test an optical property of an optical path.

Refer now to FIG. 4 which shows a process flow diagram of one method of the invention to measure astigmatism. The system 10 is initialized in step 82. Limits for panning in the Z axis are established in step 83. The center of the test pattern is found in step 84 and in steps 85, 86, 87 and 89 the image of the test pattern is analyzed by host processor 32. A check is made in step 87 to determine whether or not a predetermined requested number of images have been collected and analyzed. If the conditions of step 87 are met, the process flows to step 88 to find the focal plane separation. Otherwise, the process flows to step 89 to move the stage. In step 88 the focal plane separation, and thus the astigmatism of the optical system, is found.

Figure 17C:
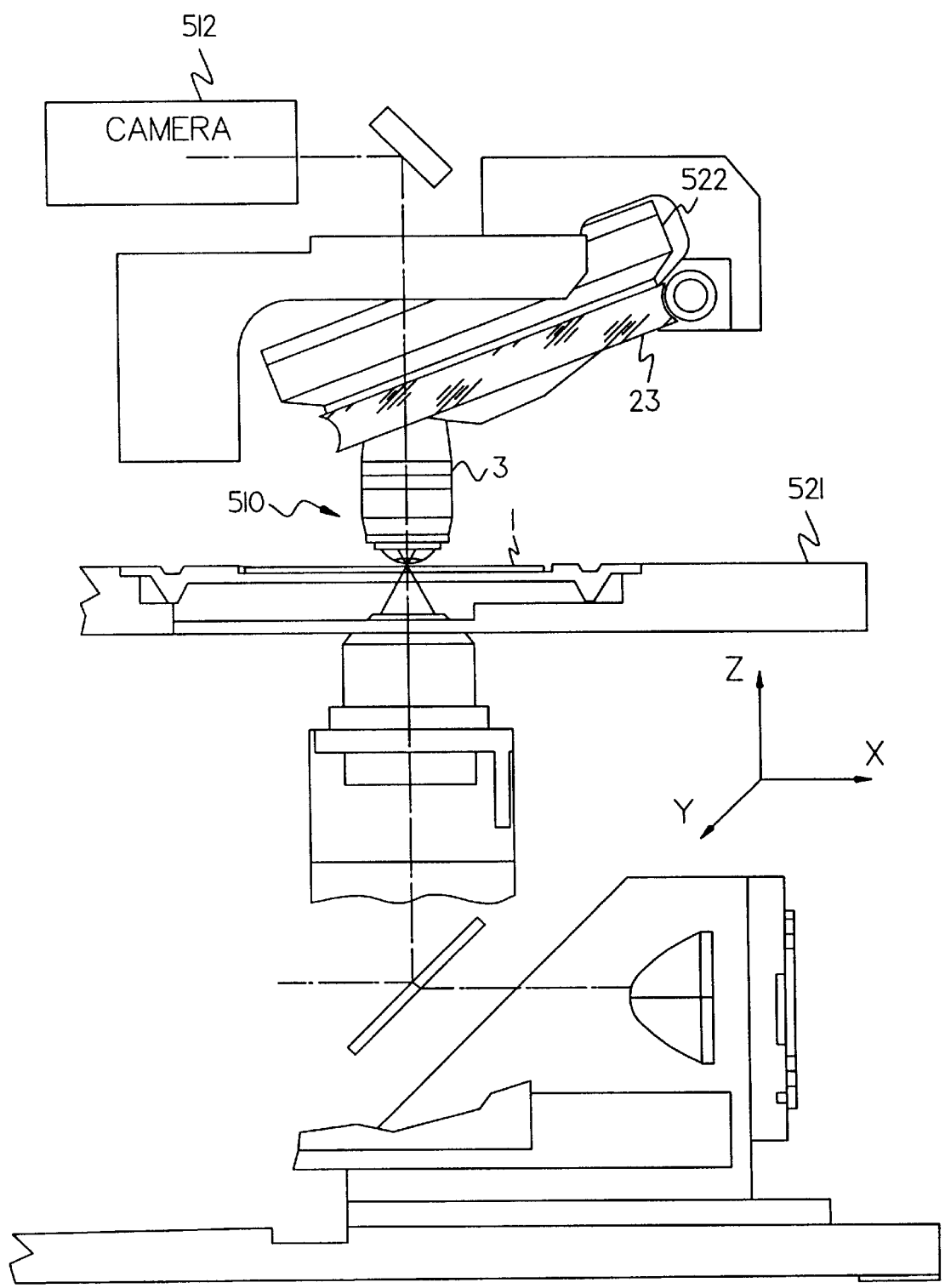

During the step 83 of initializing the system the lens turret 23, shown in FIG. 17C, is rotated to bring the 4× objective into alignment with the optical axis of the automated microscope 502. The test pattern 18 is also moved into the optical path. The stage 521 is moved to an initial location in X, Y and Z that was previously determined during system calibration according to the method described below. The initial location delivers a focused image of the test pattern 18 approximately centered in the field of view.

Figure 5A:
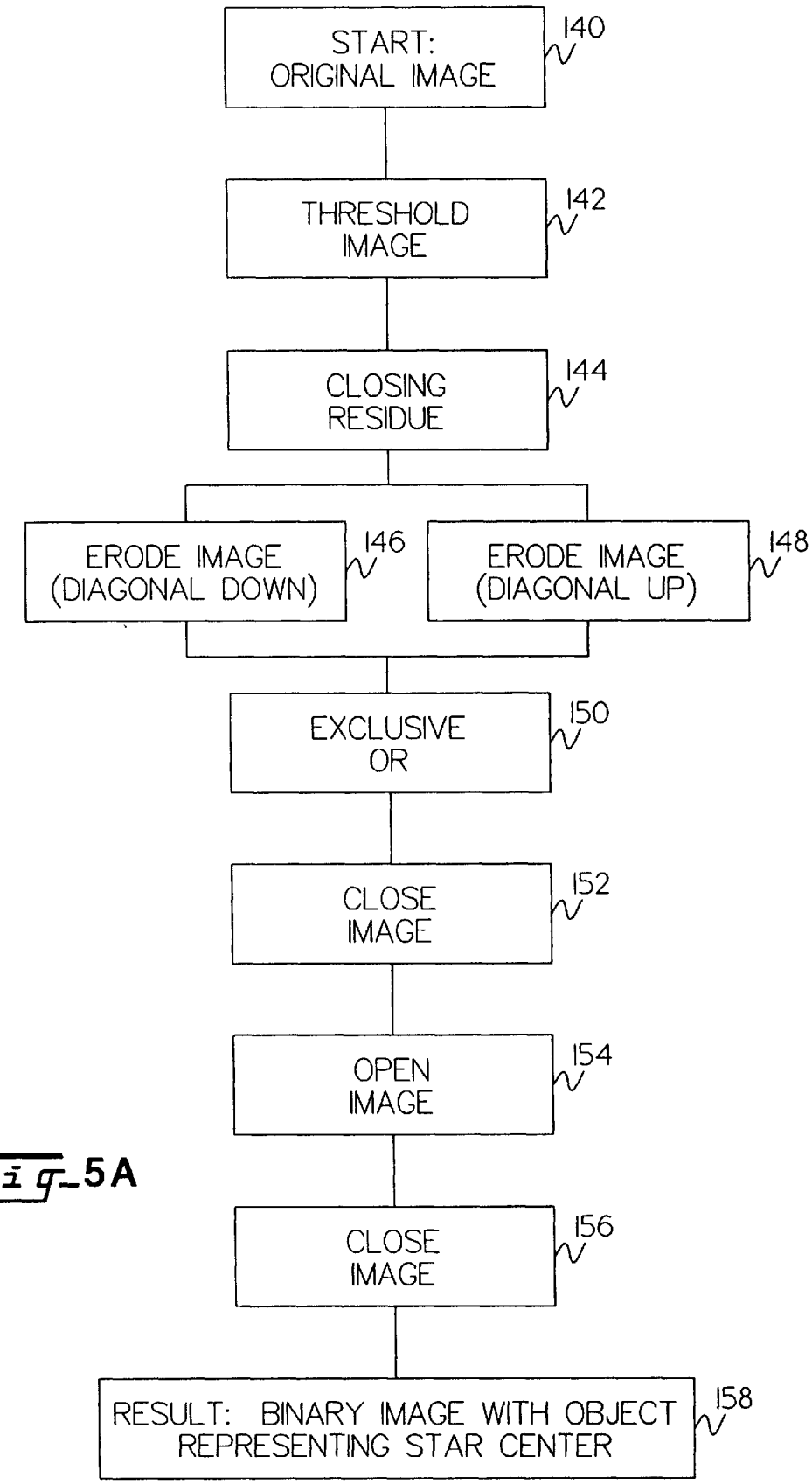
FIG. 5A shows the method of the invention to find the test pattern center.
Figure 5C:
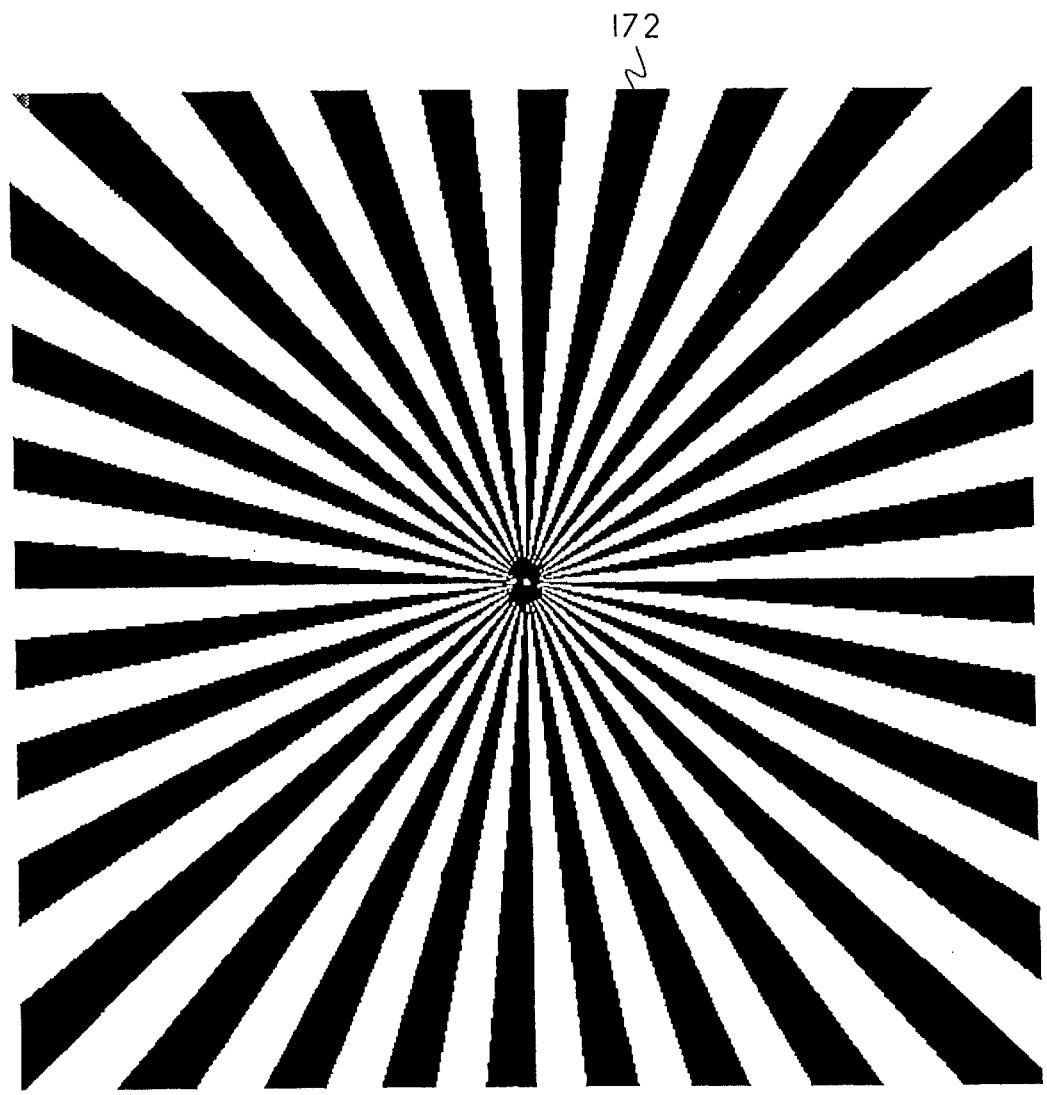
FIG. 5C shows a thresholded image.
Figure 5D:
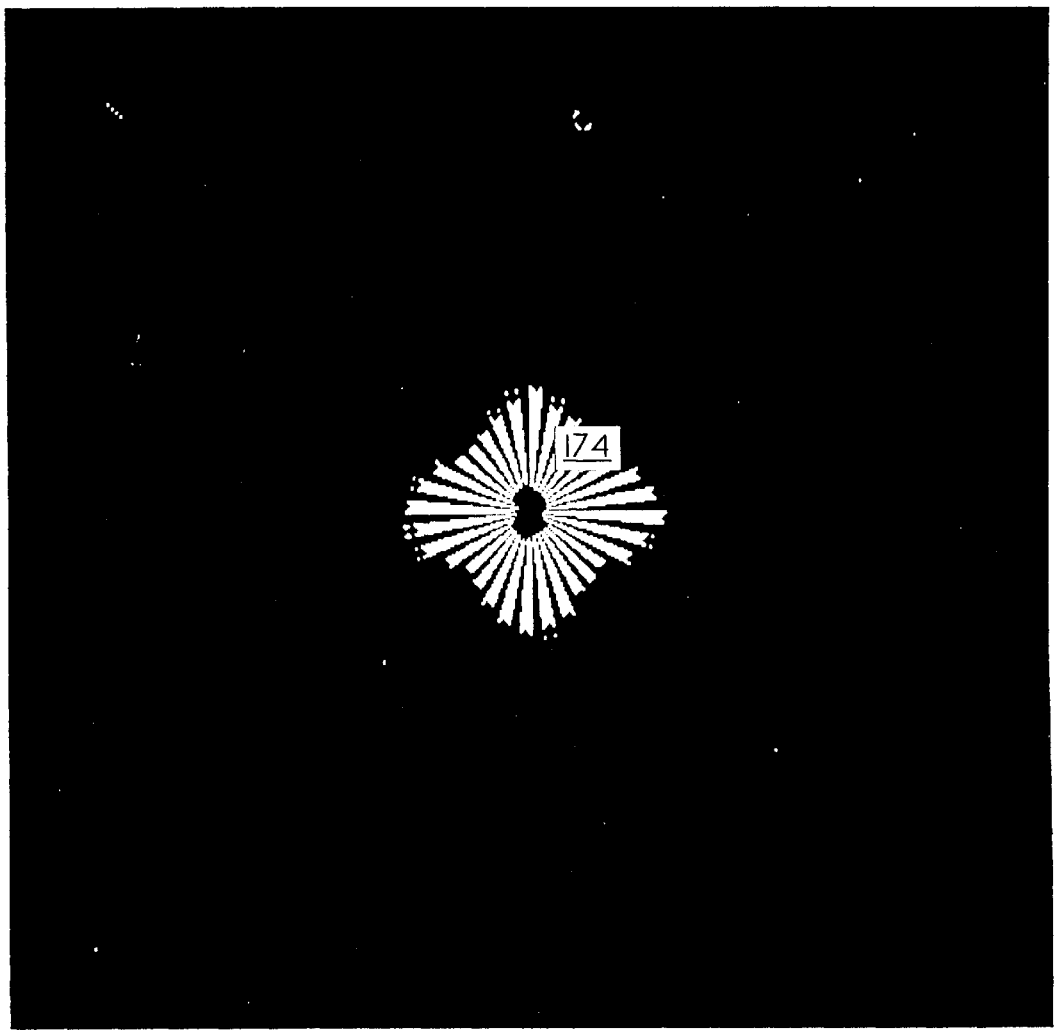
FIG. 5D shows a closing residue image.
Figure 5F:
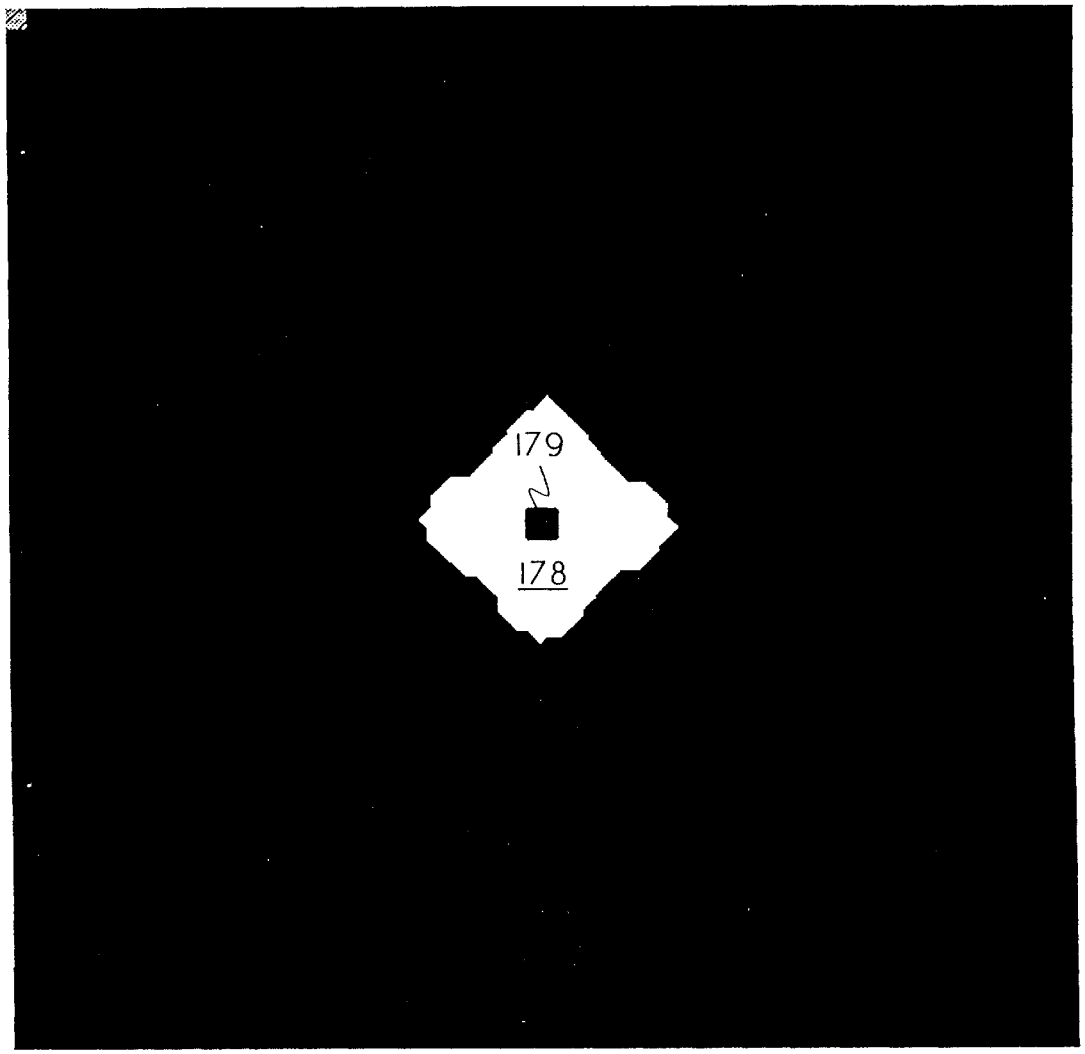
FIG. 5F shows a final test pattern image center.

Refer now to FIGS. 5A–5F which illustrate the method of the invention for initially finding the center of the test pattern 18 in X, Y and Z Cartesian coordinates during system calibration. These steps are preliminary to step 84 where a more exact center of the test pattern 18 is found. The test pattern 18 is shown in FIG. 5B as a star pattern but those skilled in the art will recognize that other patterns may be used. An original gray scale image 170, shown in FIG. 5B, is acquired at step 140 by the image acquisition electronics 28. In step 142, the original gray scale image 170 is thresholded to create a binary thresholded image 172 as shown in FIG. 5C. In step 144, a morphological closing residue operation is performed on the binary thresholded image 172. A closing residue operation generates a closing residue image 174 as shown in FIG. 5D. The closing residue image 174 of the thresholded image 172 identifies a possible area where the star arms converge in the center. The closing residue image 174 is then eroded by a diagonal bar slanted down in step 146 and eroded by a diagonal bar slanted up at step 148. The two images are exclusive ORed together at step 150. The resulting image represents the area around the possible star center. Using the above steps, the method of the invention has 9 filtered out other images that may be misinterpreted as a star pattern such as a horizontal or vertical cross image. The diagonal erosion image is shown as image 176 in FIG. 5E. Image 176 is then morphologically closed at step 152. The resulting image of step 152 is opened in step 154, and the resulting image of step 154 is closed again at step 156 to merge the image elements around the star element to one object while filtering out any noise. The resulting final image is shown as image 178 in FIG. 5F. If there is a central region 179 left in the image 178 that fits within a range of empirically determined limits, the central region 179 represents the center of the star and the central region 179 is defined as the center of the test pattern in step 158.

Refer again to FIG. 3 and FIG. 4, in step 83 the best focus position for the calibration plate holding the test pattern image is determined. In order to establish the motion limits for a Z axis panning sequence a series of images of the test pattern 18 are acquired and examined for overall resolution. The position yielding the best overall resolution, is chosen for the middle of the Z axis panning range. A series of images is then collected beginning at the lower limit of the stage 16 elevation and extending to-the upper limit of the stage 16 elevation. The extent of the Z axis panning range will be about twice the depth of field of the optical path in use. Because the stage 16 is moved in the Z direction from a position below the calibration Z coordinate to a position above the calibration Z coordinate the pattern on the calibration slide 18 will pass through optimum focus. The quality of focus is measured for each of the images in this panning sequence and the Z-coordinate of the highest resolution image is recorded.

Figure 6A:
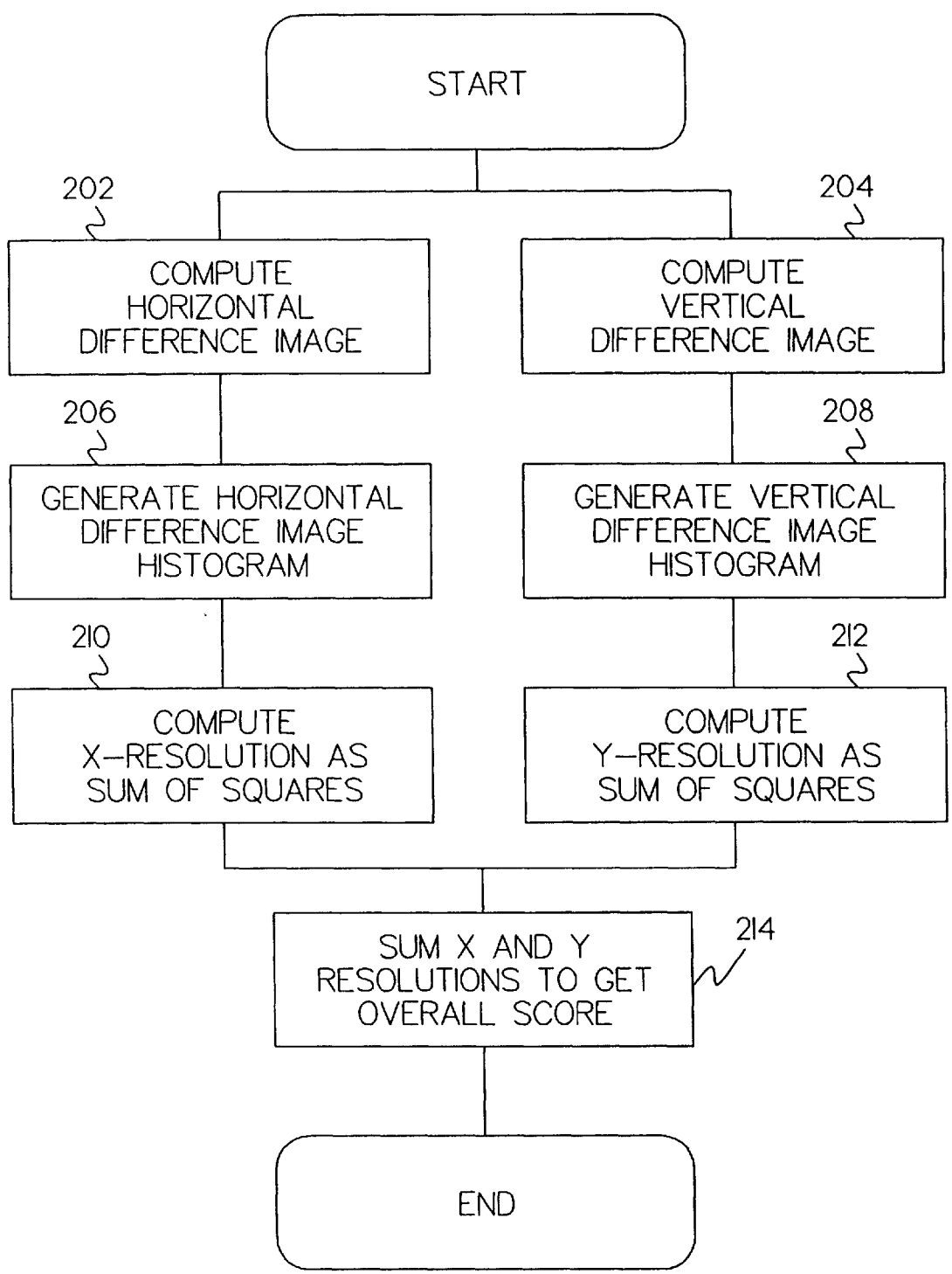
FIG. 6A shows the method of the invention to calculate the quality of focus.

The quality of focus measurement used at each Z position in the Z panning sequence is illustrated in FIG. 6A. In step 202 a difference image is generated by subtracting the value of a given pixel from the value of the pixel to its immediate right in each original gray scale image 170. In step 204 a difference image is generated by subtracting the value of a given pixel from the value of the pixel immediately below the given pixel in each original gray scale image 170. The differences are referred to as "gradients". These operations are described by the following equations. The horizontal-displacement difference image is described by $$Grad_x[i][j]=ABS\{A[i+1][j]-A[i][j]\}.$$

The vertical-displacement difference image is described by $$Grad_y[i][j] = ABS\{A[i][j+1] - A[i][j]\},$$

where ABS is the absolute value operator,
   i=image coordinate in the X-direction,
   j=image coordinate in the Y-direction, and
   A=image amplitude (integer pixel value).

A histogram is then calculated for each of the difference images, shown as steps 206 and 208. Each histogram is comprised of 256 bins, one bin for each possible integer pixel value. The value of the histogram for each bin is equal to the number of pixels having the amplitude assigned to that bin. Thus, two dependent variables, $N_X(A)$ and $N_Y(A)$, are described by the difference-image histograms where "A" can take on any integer value from 0 to 255. Values for the resolution in the horizontal and vertical directions taken over the entire image are obtained in steps 210 and 212 by identifying the values of $N_X(A)$ and $N_Y(A)$ that exceed a certain threshold, $N_T$, and accumulating a sum of products of the squares of the amplitudes and their respective pixel counts, as follows:

$$R_X = \sum_{A=0}^{255} N_X[A] * A^2 \text{ for all } N_X[A] > N_T,$$

and $$R_Y = \sum_{A=0}^{255} N_Y[A] * A^2 \text{ for all } N_Y[A] > N_T.$$

In step 214 a single, overall score for image resolution, $R_{tot}$, is obtained by adding the two terms: $R_{tot} = R_X + R_Y$. The Z coordinate of the image with the highest $R_{tot}$ is defined as the Z coordinate with optimum focusing.

Once the Z coordinate for optimum focusing of the test pattern has been found, the beginning and ending Z coordinates for panning during the astigmatism test are placed at 50 microns below optimum focus and 50 microns above optimum focus, respectively in one embodiment. This span, equal to approximately twice the depth of field of a 4× objective, for example, allows the astigmatism test to accurately measure focal plane separations as large as one depth of field of the objective. For the purpose of the astigmatism test of the invention the depth of field may advantageously be defined as the distance along the Z axis for which the diameter of the point spread function of the objective lens is less than twice the diameter of the point spread function in the focal plane.

Refer again to FIG. 4, in step 84 the star pattern from the calibration slide 18 is precisely centered. Before collecting the images for the astigmatism test of the invention, a series of images of the test pattern 170 are collected to more exactly center the test pattern in the image field. The microscope stage 16 is moved over a search pattern, such as, for example a star pattern, until the star pattern is approximately aligned to the center of the camera 26 image field. Image analysis is performed by the image analysis computer 30 to find a more exact center of the test pattern 18 in the digitized image. The more exactly computed center is used in the astigmatism measurement method of the invention.

In one embodiment of the method of the invention, the more exactly computed center of the star pattern is found by first locating the calibration plate that contains the star pattern 18 in the center of the field of view of the imaging system as described above with reference to FIGS. 5A–5F. An image is obtained of the initially centered test pattern 18 and converted into a binary image, for example, where all pixels that have a value less than a threshold, such as the pixel value 128 out of a range from 0 to 255, are considered to be black pixels. A linear array is formed of the peripheral pixels of the image where the top, right, bottom, and left peripheral pixels of the image are assembled into a linear array. The linear array is then scanned for transitions from white to black where a black transition is defined as 5 consecutive black pixels in one example embodiment. This is to avoid noise contaminating the transition detection. The true position relative to the pixel array, of the transition is located in the image X, Y coordinates. These X, Y coordinates are stored in individual arrays X, Y for each transition. This process is continued until the entire linear array has been scanned for transitions. If more or less than 32 transitions are detected the test pattern center detection is considered as having failed. The test pattern center detection may fail due to dust on the image, incorrect initial centering of the test pattern or other optical problems, preventing the detection of transitions.

A more exact center of the test pattern 18 is computed using a slope intercept method where the slope for each pixel is computed as the Y difference over the X difference, where the Y difference is the difference between the pixel and the 16th adjacent pixel, and the X difference is computed as the difference between the pixel and the 16th adjacent pixel. Sixteen is chosen because the sixteenth pixel will be on or near the same line if there are 32 transitions. Accordingly, $$slope[i] = \frac{y[i] - y[i+16]}{x[i] - x[i+16]},$$

for i=1, . . . , 16.

Next the image center is computed based on each line and the 8th adjacent pixel according to the following equation where the i+8 pixel is on a line perpendicular to the $i_{th}$ pixel according to the following relationship.

$$center \cdot x[i] = \frac{(slope[i]*x[i] - y[i]) - (slope[i+8]*x[i+8] - y[i+8])}{(slope[i] - slope[i+8])},$$

for i=1, . . . , 8.

The Y center is computed using the slope intercept. The next step of the invention calculates the mean for the centers according to the equation $$center.y[i] = (slope[i]*(center.x[i] - x[i])) + y[i],$$

for i=1, . . . , 8.

If the center is properly located, it will be within 10 pixels of the 256×256 point for an imaging array of 512×512 pixels because the center of the test pattern has been located during calibration.

Next the computed center is evaluated according to its standard deviation. If the standard deviation of the computed center is greater than 5 pixels then the center is considered to have not been found. If it is less than or equal to 5 pixels then the center is considered to have been found. Typically the method of the invention locates the center with a 0.1 pixel standard deviation in one example embodiment. Those skilled in the art will recognize that the test pattern may have more than 32 lines in which case the collinear pixel will not be 16 element transitions away but will be the number of test line segments divided by two away. Those skilled in the art will also recognize that the orthogonal line will be the number of test line segments divided by four. Those skilled in the art will also recognize that an accurate center calculation will typically use at least the first one fourth of the number of test segments, although fewer may also be used.

Figure 7A:
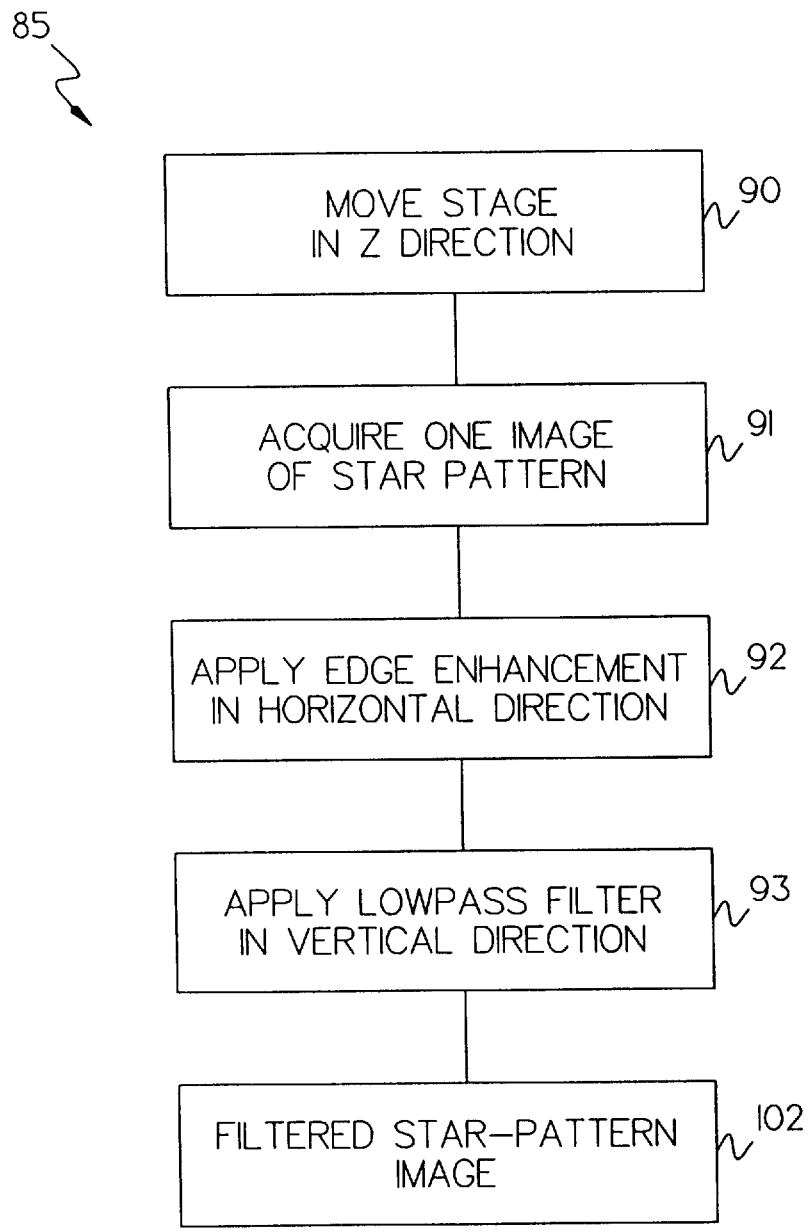
FIG. 7A shows image acquisition and filtering steps of the invention.

Refer now to FIG. 7A which shows the image acquisition and filtering step 85 of the invention in more detail. In step 90 the stage is moved along the Z axis. In one embodiment of the invention a step size for stage movement was chosen to be a small fraction, about 5%, of the depth of field of the 4× objective lens to allow the focal plane separation. to be measured with high accuracy. By way of example, and not. limitation, a step size of 2 microns is used to span the 100 micron range of stage elevation using 51 images. In step 91 an image of the test pattern 18 is captured from the video camera 26 by the image acquisition electronics 28 and transferred into memory in the image analysis computer 30 for processing.

The video camera 26, having been designed to comply with NTSC video format specifications, limits the bandwidth of the video signal such that the horizontal resolution of the image is worse than the vertical resolution. To compensate for the loss of high frequencies, each horizontal line in the stored image is convolved in step 92 with an edge enhancement filter kernel. The purpose of the edge enhancement filter step 92 is to increase the bandwidth in the horizontal direction to match that of the vertical direction. Ideally, the filter would exactly reverse the effect of the camera lowpass filter, and measurement of the camera filter gain and phase versus frequency provides a basis for the edge enhancement filter design. The inverse in complex arithmetic of the Fourier Transform of the camera lowpass filter is taken as the frequency response of a hypothetical inverse filter. However, the gain of the hypothetical inverse filter increases radically as frequency approaches the Nyquist limit imposed by the image pixel spacing. A first modification, then, is to reduce the gain very near the Nyquist limit by adding a fourth-order pole at 0.8 *f(Nyquist). The filter then becomes realizable. However, the application of this bandlimiter introduces a discontinuity at the Nyquist limit. As a consequence, the impulse response of the filter, which will become the kernel for the convolution operation used to filter the image, expands. An inordinate number of points in the kernel would be required to apply this filter at the expense of computational speed. In one embodiment, the number of required points is reduced by truncating the kernel, which introduces ringing in the filter step response, and then trimming the coefficients by trial and error to reduce the ringing to an acceptable level.

Figure 6B:
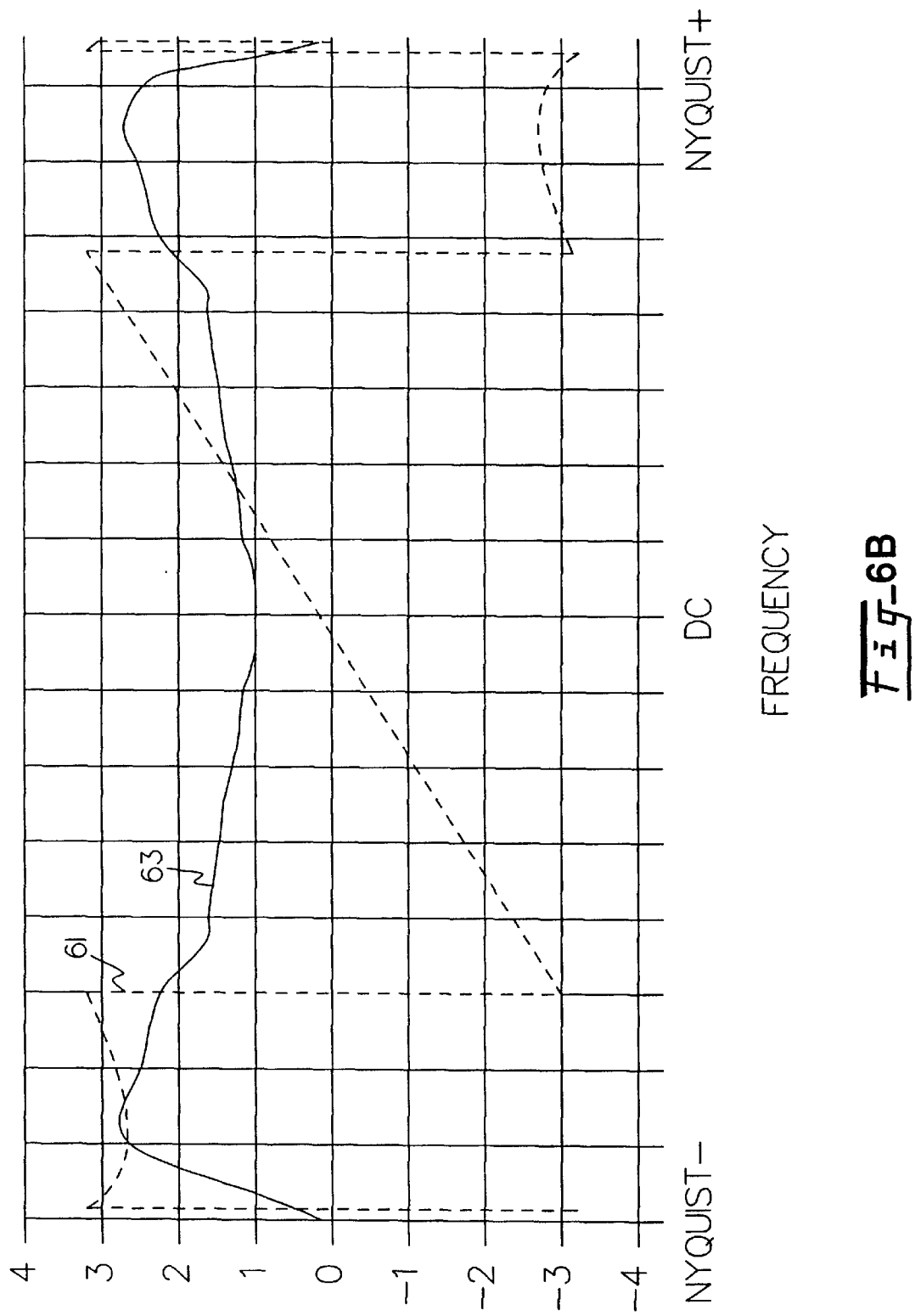
FIG. 6B shows a graph of horizontal filter frequency response.
Figure 6C:
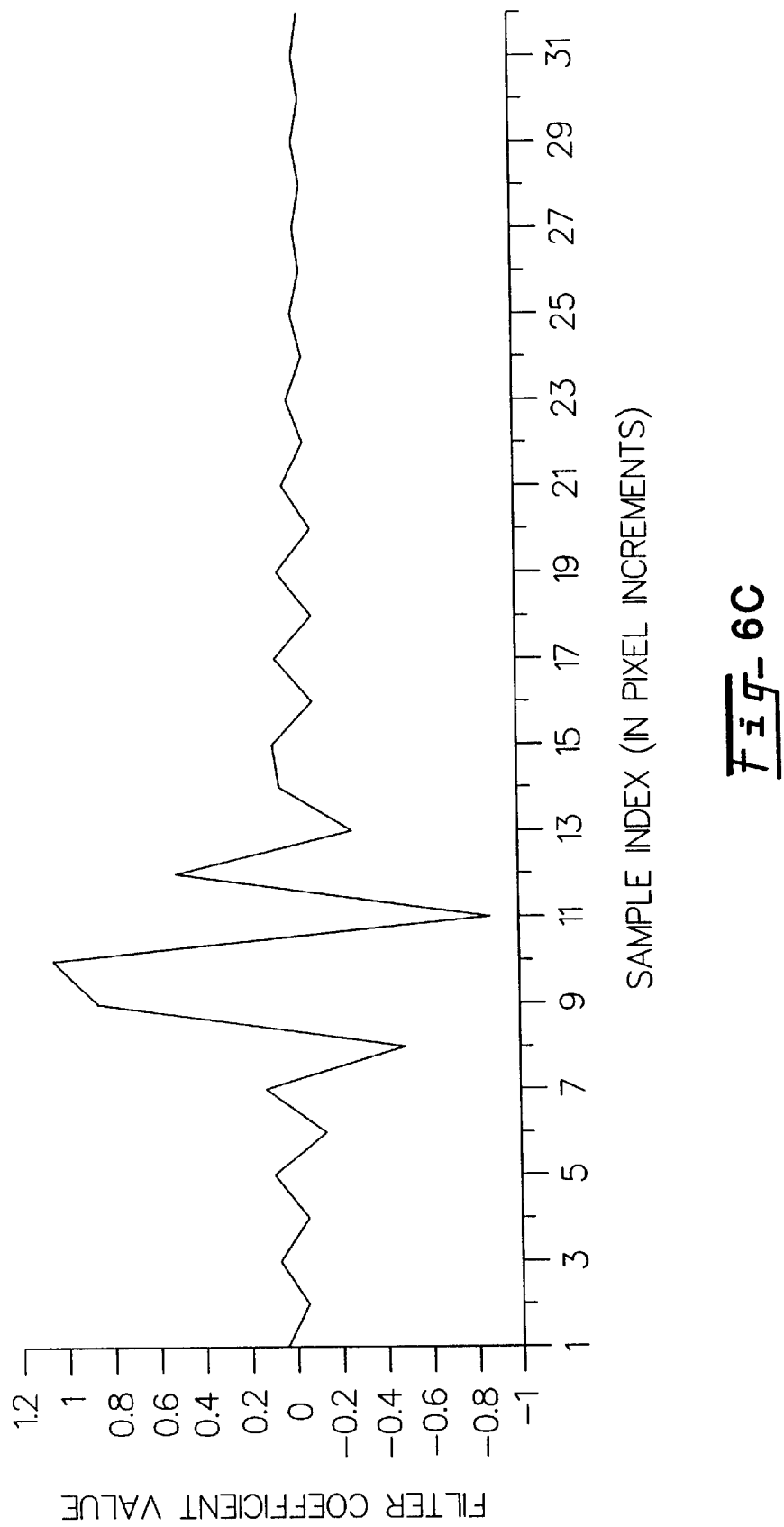
FIG. 6C shows a graph of horizontal filter impulse response.

The final horizontal filter frequency response and impulse response are shown in FIG. 6B and FIG. 6C respectively. In FIG. 6B the dashed line 61 represents filter phase shift in radians. The solid curve 63 represents filter gain.

The edge enhancement filter is implemented by the image analysis computer 30 in step 92. In step 93 a lowpass filter is applied in the vertical direction. Because of the upper-end cutoff installed in the edge enhancement filter, the image must be filtered in the vertical direction to accomplish the final horizontal-to-vertical bandwidth matching. The vertical filter is a simple Gaussian filter with a time constant of 0.718 pixel increments. The equation for the impulse response is $$gain = e^{-t^2}/0.718_2.$$

Figure 6D:
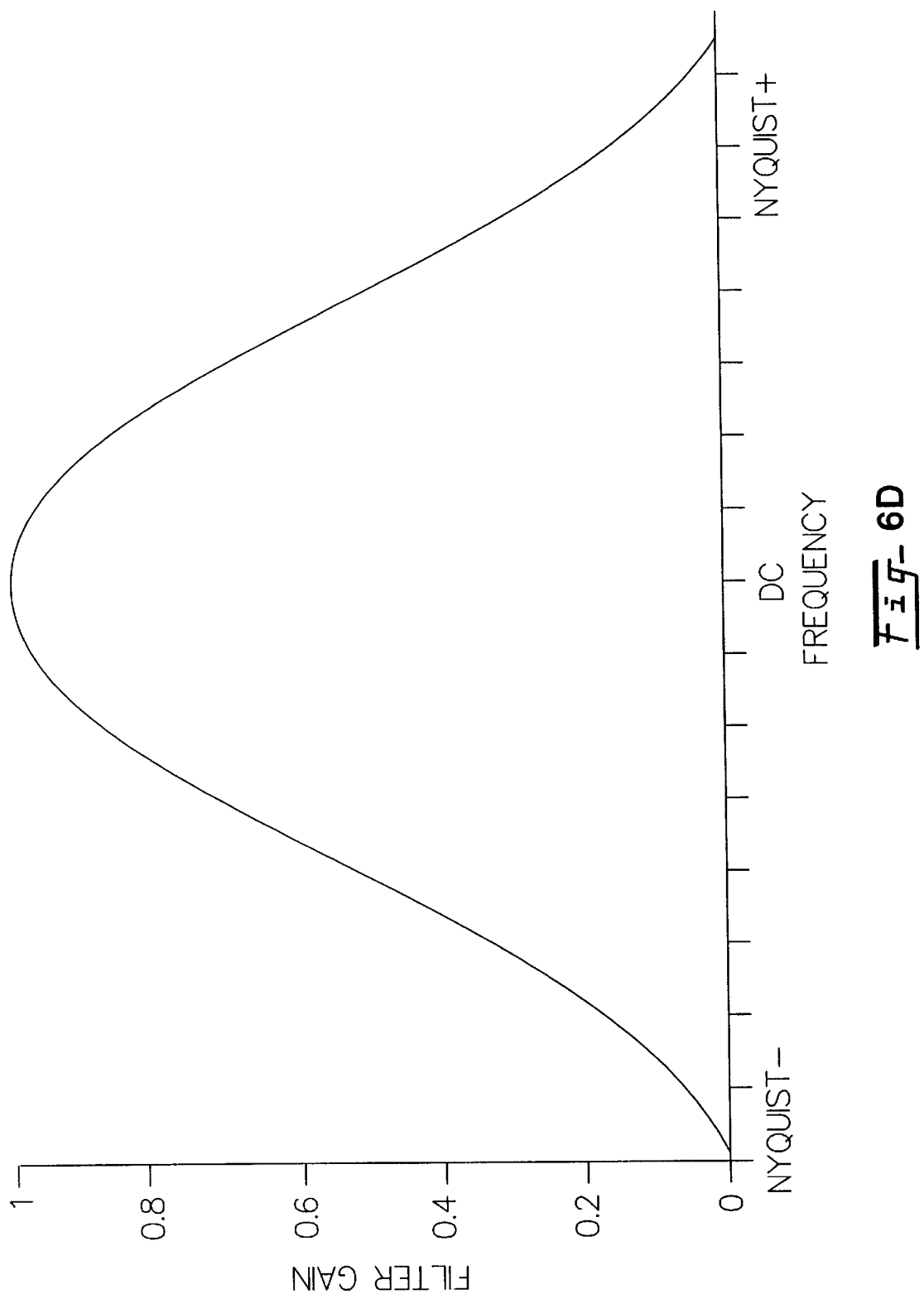
FIG. 6D shows a graph of vertical filter frequency response.
Figure 6E:
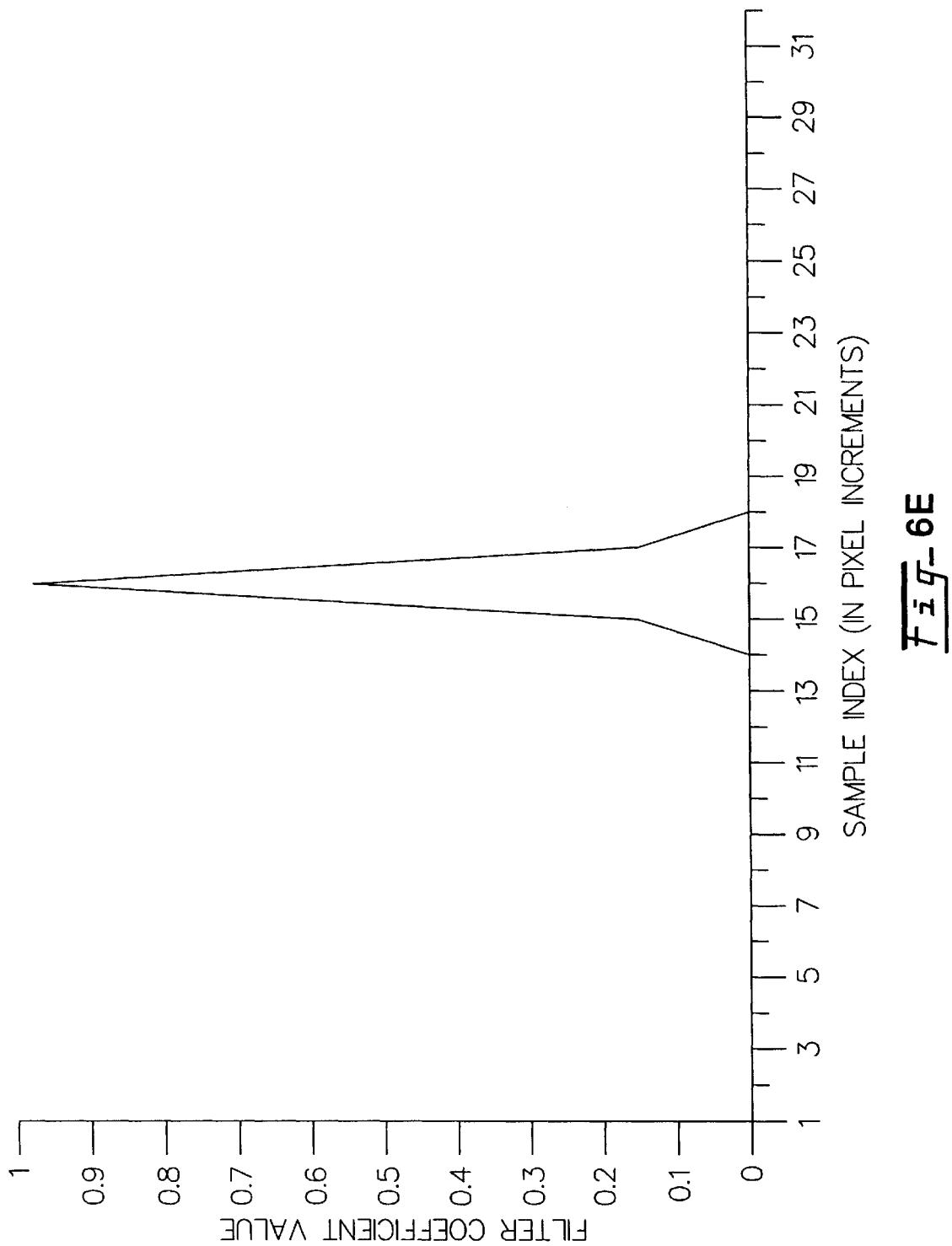
FIG. 6E shows a graph of vertical filter impulse response.

The vertical filter frequency response and impulse response are shown in FIG. 6D and FIG. 6E, respectively. Those skilled in the art will recognize that other methods of acquiring a digital representation of the test pattern image are within the spirit and scope of the invention.

Refer now to FIG. 8A which shows the image analysis step 86 of the method of the invention in more detail. At step 102 filtered images of the test pattern image are presented for processing. The method of the invention then computes the X Gradients and Y Gradients of the image in step 104 according to the gradient equations shown hereinabove with reference to FIG. 6A. The gradient operators are 2 pixel structure differences along each axis. For each filtered test pattern image, an X Gradient and Y Gradient image is generated. An example of an X-Gradient image is shown in FIG. 7B.

Figure 8B:
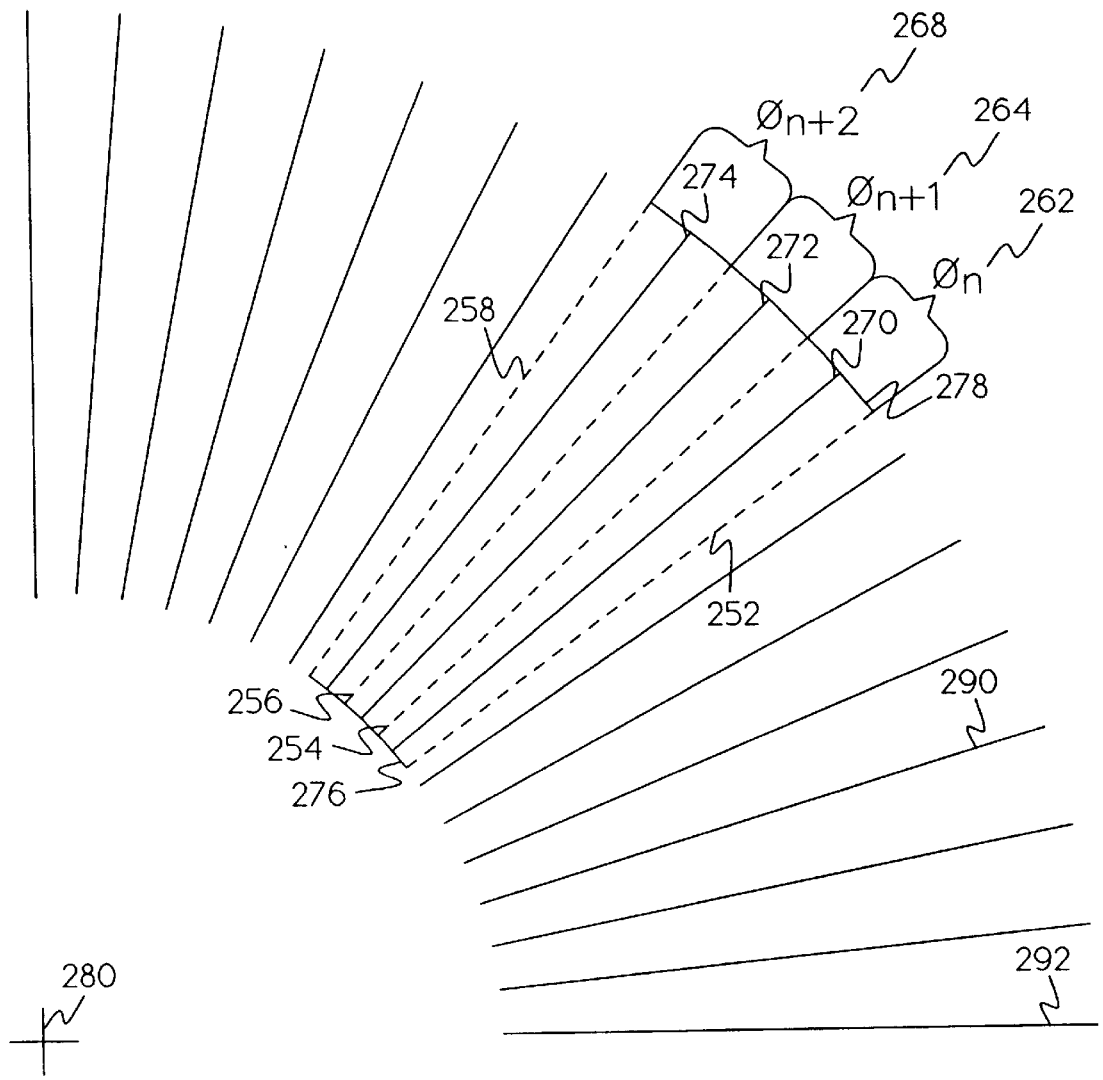
FIG. 8B shows an example of the boundary angle region analysis method of the invention.
Figure 8C:
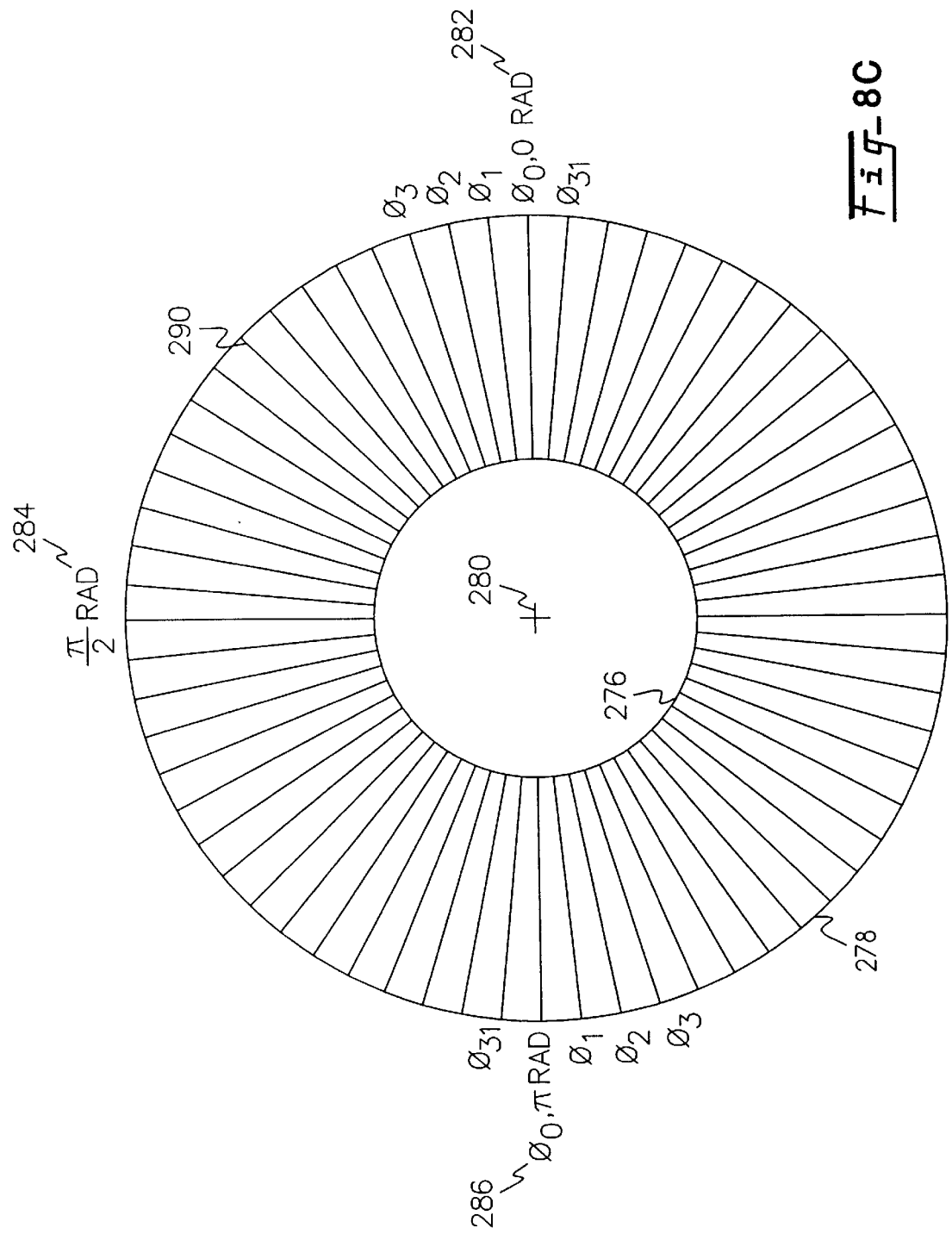
FIG. 8C shows an example of a set of boundary angle regions for a test pattern.

Refer also to FIGS. 8B and 8C which show an example of the boundary angle regions used in the method of the invention. Because each test pattern center can be precisely located by the above described methods, the invention can divide the test pattern image into predetermined boundary angle regions. These boundary angle regions contain those pixels that qualify for further analysis. FIG. 8B shows EL quarter of the combined X gradient and Y gradient test pattern gradient image and FIG. 8C shows the entire combined test pattern gradient. In FIG. 8B each pixel falls into a particular region, called boundary angle regions 290, preassigned an angle designation based on the center angle from the horizontal 292. For example, the center 280 defines radians 252, 254, 256 and 258 which define boundary angles 262, 264 and 268. The boundary angle region $\varnothing_n$ 262, between radians 252 and 254 and bounded by outer circle 278 with center 280 and inner circle 276 with center 280, contains the boundary angle pixels 270. The boundary angle region 264 $\varnothing_{n+1}$, between radians 254 and 256 and bounded by outer circle 278 with center 280 and inner circle 276 with center 280, contains the boundary angle pixels 272. Likewise, the boundary angle region 268 $\varnothing_{n+2}$, between radians 256 and 258 and bounded by outer circle 278 and inner circle 276, contains the boundary angle pixels 274. At step 106 the pixels are sorted into bins by boundary angle. Pixels outside a predefined ring, defined by inner circle 276 and outer circle 278, are discarded in step 108. Note that pixels very near the center of the image are ignored because the boundaries of the star pattern converge to dimensions too small to be properly represented by the pixel array.

The gradient image is shown for the entire test pattern in FIG. 8C. Example boundary angle regions 290 for the test pattern include the 0 radian angle 282, the $\pi/2$ radian angle 284 and the $\pi$ radian angle 286. In step 110, pixels in the gradient image are tested against a threshold. Since the amplitude derivative of any given boundary is projected on to the X gradient by the cosine of boundary angle and onto the Y gradient by the sine of the boundary angle, the magnitude of the gradient is the vector sum of the X and Y gradients. This vector sum would normally be calculated as the square root of the sum of the squares of the X gradient and Y gradient. However, the square root operation can be avoided by comparing the sum of the squares to a value that is the square of a predetermined threshold according to the relationships if $Grad_X[i][j]^2 + Grad_Y[i][j]^2 < threshold^2$, then $Grad_X[i][j]=0$, and $Grad_Y[i][j]=0$.
These low gradient values are suppressed for the purpose of increasing the signal-to-noise ratio in the residue calculations.

In step 112, a summation is performed for each boundary angle region over the qualified set of pixels for that angle and normalized by dividing by the number of pixels contributing to a boundary angle region, N. The gradient values for each pixel in a boundary angle region are squared and summed in step 112 and divided by the number of pixels. The summations may be expressed as $$SUM_X(\varnothing) = (\Sigma Grad_X(i,j)^2)/N,$$

$$SUM_Y(\varnothing) = (\Sigma Grad_Y(i,j)^2)/N,$$

where pixel [i,j] lies in the boundary angle region at angle ø. N equals the average number of qualified pixels contributing to a boundary region, this average taken over all the boundary regions in the test pattern image. The division by N serves to scale $SUM_X(ø)$ and $SUM_Y(ø)$ so that the residue value from the calculation that follows is of the same order of magnitude as the original image amplitude scale.

In step 114 the mean residue for each boundary angle region is computed by combining the two summations in quadrature as follows $$MAG(\phi) = \sqrt{SUM_X(\phi) + SUM_Y(\phi)}\ ,$$

where MAG(ø) is defined as the magnitude of the residue for each boundary angle region ø. MAG(ø) is also called the residue value.

In step 115 the set of residue values, one for each boundary angle, for the current image is stored for later use in the calculation of focal plane separation.

The residue value, MAG(ø), is an expression of boundary sharpness divided into boundary angle bins that cover the angles of the boundaries in the star pattern. In step 116 a reading of the overall image resolution is obtained by averaging over this array as $$meanRES = \left( \sum_{\phi=0}^{\pi} MAG(\phi) \right) / M,$$

where M is the number of boundary angle regions.

Figure 11:
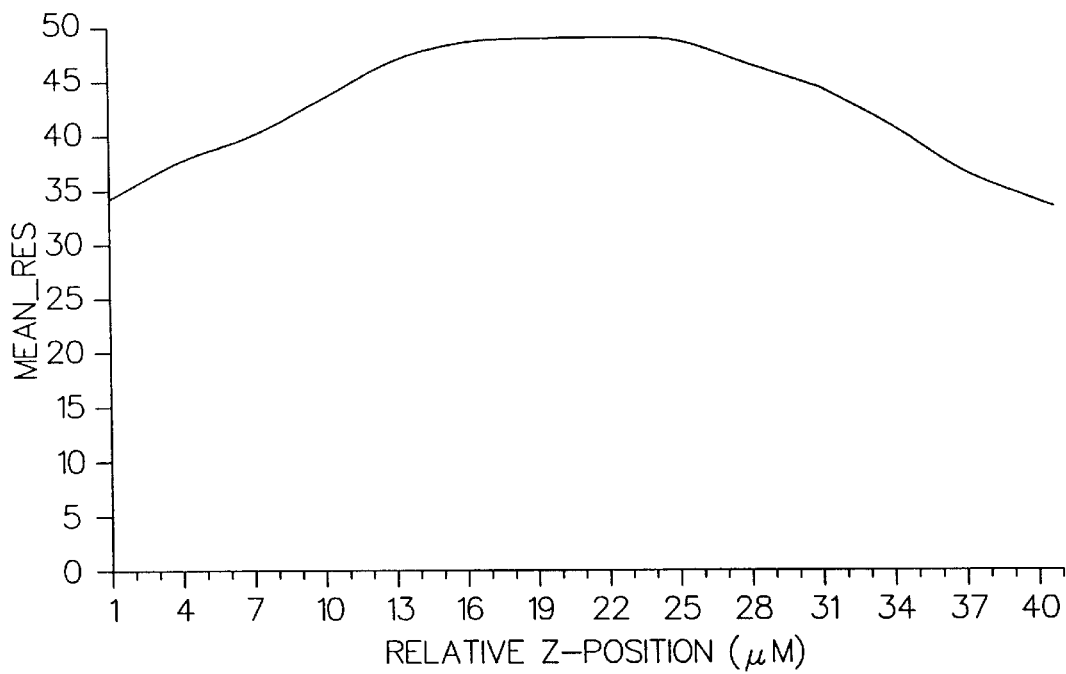
FIG. 11 shows an overall mean residue versus Z coordinate plot.

In step 117 the value of the Mean Residue for the current image is stored for use in normalizing the Center of Gravity Vector. This mean resolution estimate, meanRes, may be used to check the Z panning image sequence to assure that it encompasses the region around the best focus for the calibration plate. A plot of the Overall Mean Residue versus Z Position is shown in FIG. 11 for one example optical system.

Although the actual point spread function of the optical path is not directly measured, its shape can be inferred from the boundary-angle-dependent resolution measurements. The higher the residue value, the higher the resolution. If the resolution is independent of boundary angle, the point-spread function is round. If the horizontal boundaries are sharper than the vertical boundaries, the point-spread function is elongated and its long axis lies along a horizontal line. The long axis of the point spread function operative on a given image is oriented at the angle of the sharpest boundary.

In step 118 the Center of Gravity (COG) Vector is a mechanism for expressing the eccentricity of the shape of the point spread function, which is carried by the magnitude of the COG vector, and the angle of the major axis of the point spread function, which is carried by the angle of the COG vector.

The Center of Gravity Vector is found by spreading the 180 degrees of boundary angles in the star pattern around a circle and taking the moments of the Mean Residue around the X axes and Y axes of this new circle. For a round point spread function, the residues balance around each axis, and the COG vector is zero. If some boundaries are sharper than others, however, they dominate the moments, and the COG vector has a non-zero magnitude and a definite angle.

The COG vector is observed as stage Z position is varied to see if it rotates and where it peaks. The Moments are computed as $$M_X = \sum_{\phi=0}^{\pi} [\cos(2\phi)*MAG(\phi)], \text{ and}$$

$$M_Y = \sum_{\phi=0}^{\pi} [\sin(2\phi)*MAG(\phi)].$$

The moment calculation generates the Cartesian representation of the Center of Gravity vector. The magnitude of the COG, r_COG, is computed as the quadrature sum of the two moments $$r\_COG = \sqrt{[M_X^2 + M_Y^2]}\ .$$

Figure 12:
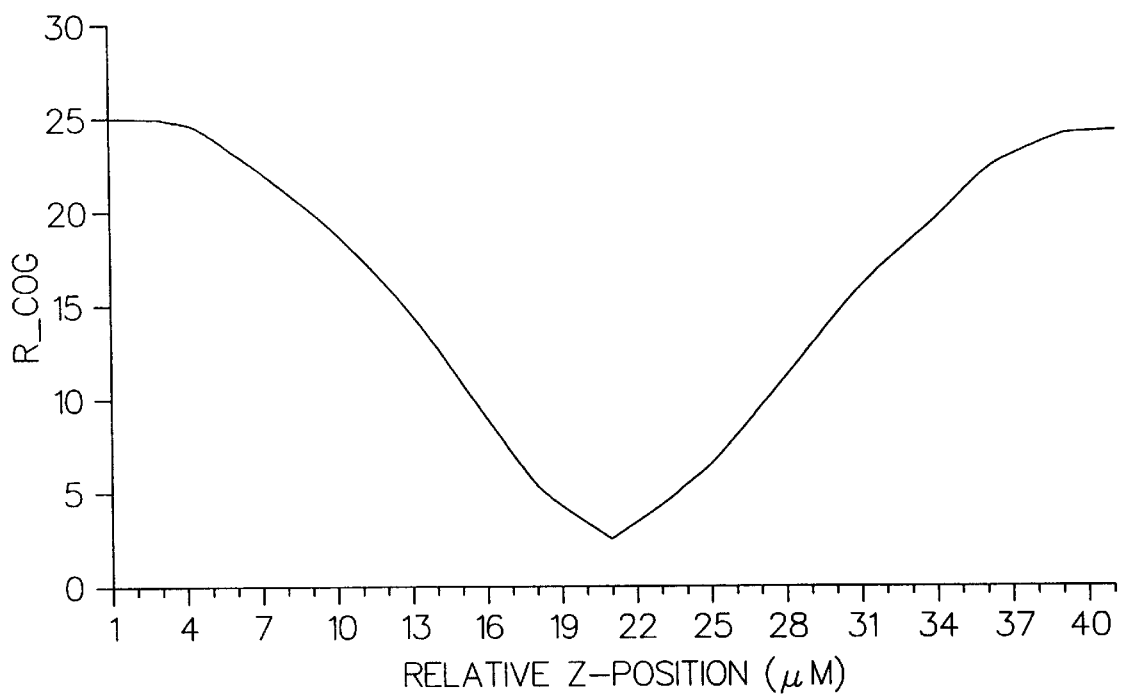
FIG. 12 shows a plot of the magnitude of the center of gravity versus Z coordinate.

This magnitude of the Center of Gravity is an expression of the eccentricity of the point spread function. A larger $r_{13}$ COG indicates greater distortion in the optics system and a more pronounced angle dependence of the boundary sharpness. A plot of $r_{13}$ COG versus Z position is shown in FIG. 12 for one example optical system.

The angle of the COG vector, $\theta_{13}$ COG, is also computed from the X and Y moments $$\theta\_COG = \frac{\arctan\left[\frac{M_Y}{M_X}\right]}{2}\ .$$

Note that the division by 2 is the operation of unwrapping the boundary angle, which runs from 0 to π, from the circle that was created for calculating the moments.

In step 119 the values of r_COG and θ_COG are stored for later use in quantifying the severity and orientation of the astigmatism in the optics system.

In step 120 the next image in the Z panning sequence is accessed and steps 104 through 119 are repeated. This cycle continues until all the images in the Z panning sequence have been processed. The values stored in steps 115, 117 and 119 form tables indexed by the stage elevation in the Z axis, and will be used in the analysis of the Z axis dependent behavior of the point spread function in later steps 120 and 122.

For this computation, the bins for four angles are suppressed to zero and ignored in all further computations. These angles are 0, π/4, π/2, and 3π/4, which are the vertical, horizontal, and diagonal boundaries in the test pattern. In the case of the horizontal boundary of the star pattern, for example, the X Gradient would ideally take on a value of zero, which would be a useful result. However, in a real image, the horizontal boundary will sporadically cross into and out of adjacent pixel rows, yielding a non-zero, noisy value for the X Gradient. The same phenomenon occurs for the vertical and diagonal boundaries, which similarly lie parallel to lines that could be drawn through the centers of adjacent pixels.

Those skilled in the art will recognize that an integral over the square of the gradients in X and Y, $SUM_X(ø)$, $SUM_Y(ø)$, is one of a class of operators that offers four features: (1) sensitivity to changes in the sharpness of step-type boundaries, (2) rotational invariability in the limit of infinitely fine sampling of the image, (3) invariance to the sampling density of the image, and (4) second-order dependence on illumination level. Those skilled in the art will recognize that other operators may be used in place of the above integral without deviating from the scope of the invention.

The $Grad_X(i,j)$ and $Grad_Y(i,j)$ operators are first-order derivatives of the image, which take on positive values for any non-zero amplitude shifts along their respective paths. As the boundary sharpness falls, the derivative falls, but the number of pixels in a boundary increases. The integral of the first order gradient then will be unaffected by changes in boundary sharpness, whereas the integral of the gradient squared will express sharpness.

Rotational invariance is provided by the orthogonality of the two gradients. For any boundary angle, $SUM_X(\emptyset)$ and $SUM_Y(\emptyset)$ are related through $\cos^2(\emptyset)$ and $\sin^2(\emptyset)$. The square root of the sum of the two terms provides an angle-independent resolution measurement.

The measurement for scale invariance in the operator is found in the absence of units of length in the outcome, because the 1/length units in the derivative are canceled by the length units of the two-dimensional integration.

Finally, the second-order dependence of the operator on image brightness guarantees the illumination dependence. The operator can be broadened to the general class expressed as $$[(grad\ I)^2]^*(1-n)^*(-grad^2\ I)^{\wedge}n,$$

where I is the image.
All members of this class of operators meet the first three critical features, but not the fourth.

Figure 9A:
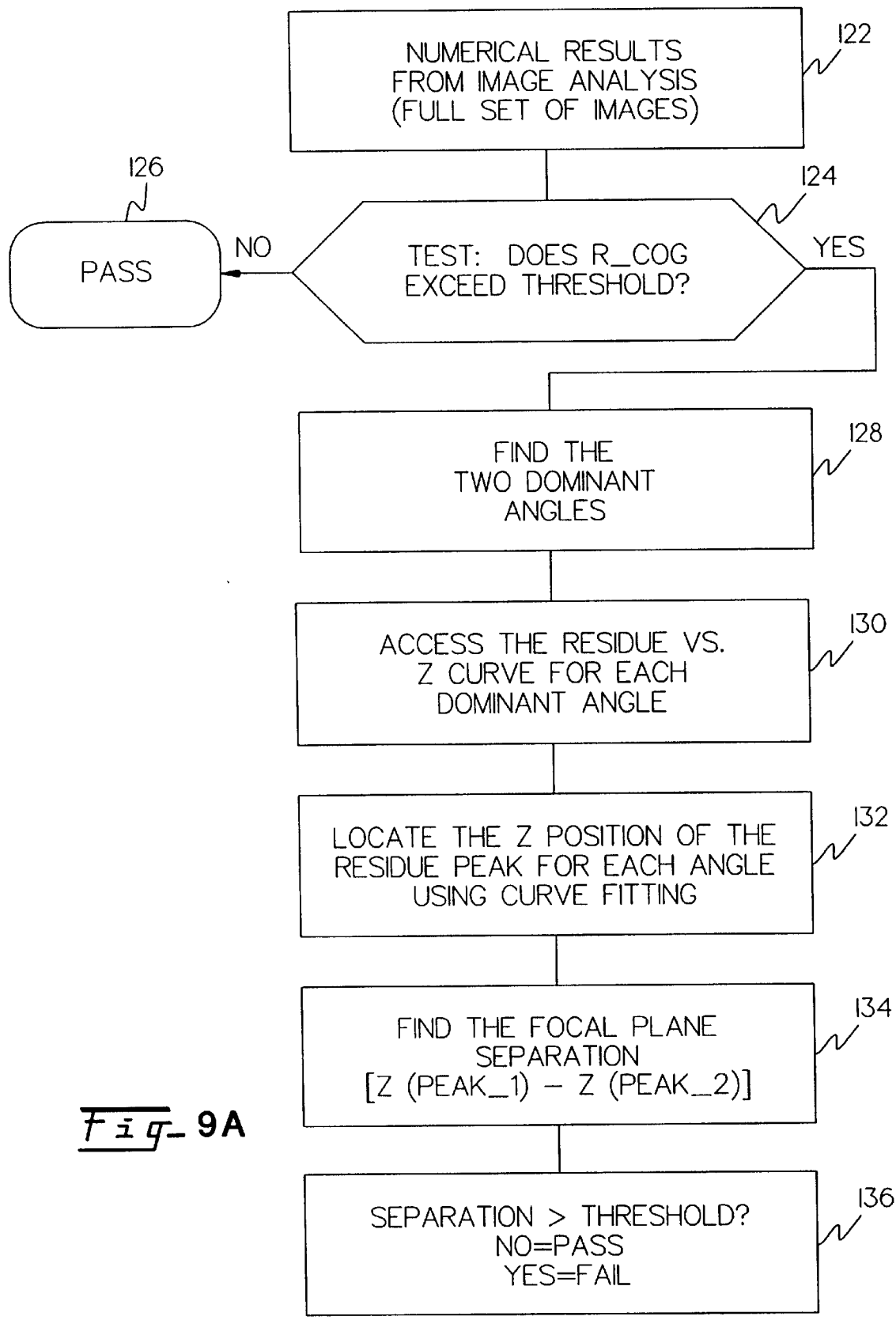
FIGS. 9A and 9B show one embodiment of focal plane separation steps of the invention.
Figure 9B:
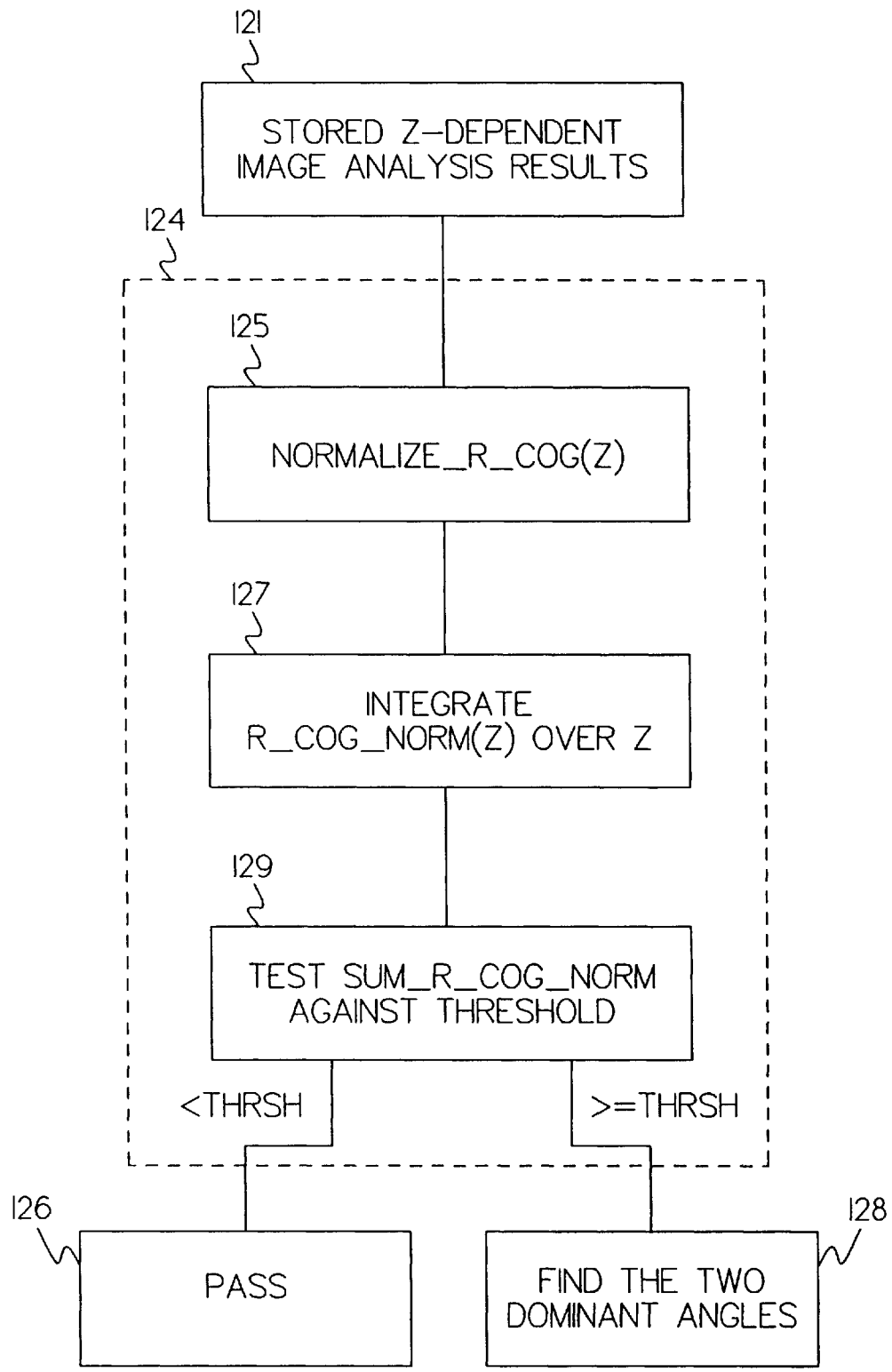
Figure 10:
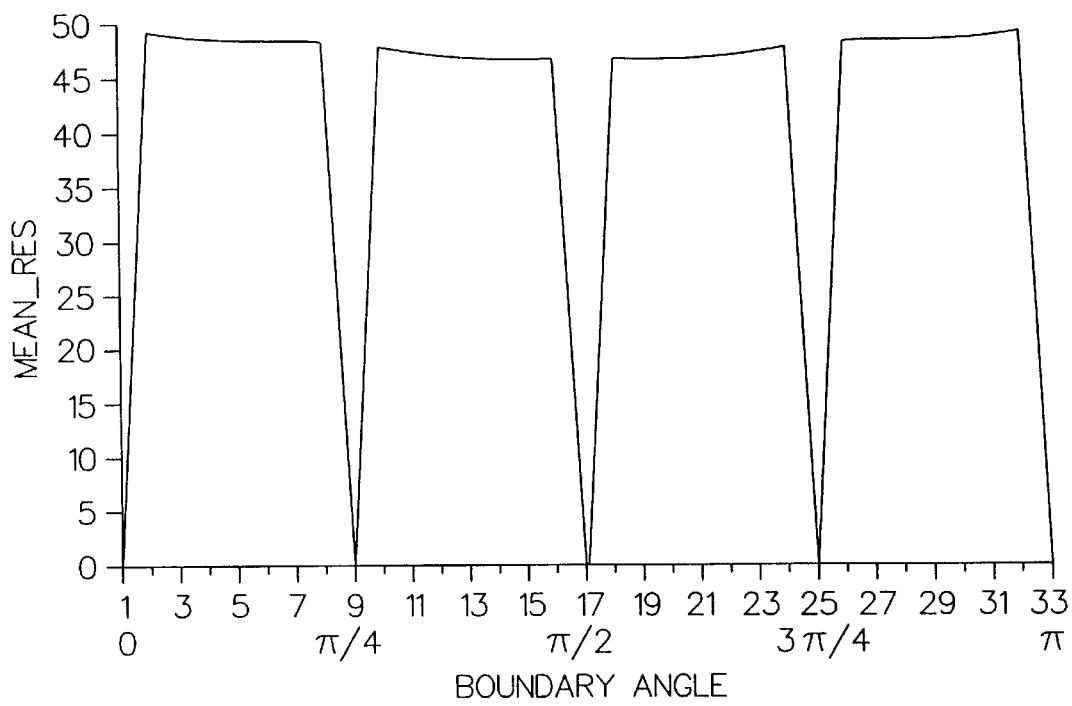
FIG. 10 shows a mean residue versus boundary angle plot.

FIGS. 9A and 9B show the method of the invention to compute the focal plane separation. The method of the invention assumes that the point spread function is persistently eccentric over the Z panning sequence, as indicated by the magnitude of the Center of Gravity Vector. An initial test is performed in step 124 for this persistent eccentricity. The method of step 124 is elaborated in FIG. 9B.

In step 125 Normalized Magnitude of the Center of Gravity, r_COG-norm(Z) is computed for each image in the Z panning sequence. It is computed by dividing the Magnitude of the Center of Gravity for each image by the Mean Residue of that image. For each value of Z, an r_COG_norm(Z) is computed for each image in the Z panning sequence by $$r\_COG\_\text{norm}(Z) = \frac{r\_COG(Z)}{\text{mean}\_RES(Z)}.$$

The r_COG_norm(Z) is an expression of the eccentricity of the point spread function because it is equal to the fraction of the residue integrated over all boundary angle regions that is not nulled out by the computation of the moments in the Center of Gravity calculation. It is independent, then, of the variation in overall image resolution as Z is varied.

The presence of astigmatism is precluded by the absence of persistent eccentricity of the point spread function. Therefore, the integral over Z of r_COG_norm(Z) is computed in step 127 as $$\text{Sum}\_r\_COG\_\text{norm} = \sum_{z=1}^{n} r\_COG\_\text{norm}(Z),$$

where n=number of images in the z-panning sequence.

In step 129, Sum_r_COG_norm is compared with a threshold. If Sum_r_COG_norm falls below the threshold, the possibility of astigmatism is dismissed, and the instrument is given a "PASS" result for the Astigmatism Test in step 126. If Sum_r_COG_norm exceeds the threshold, the program proceeds on to the computation of the Focal Plane Separation.

The threshold value for Sum_r_COG_norm is found from empirical evidence about its relationship to the Focal Plane Separation. Characterization data is gathered from a plurality of optical systems with astigmatism of varying severity. A criterion is set for the maximum allowable Focal Plane Separation, typically not exceeding 25% of the depth of field of the objective lens of the system. The threshold Sum_r_COG_norm value is found by interpolation of values in the neighborhood of the crossing of the established Focal Plane Separation threshold.

Figure 13:
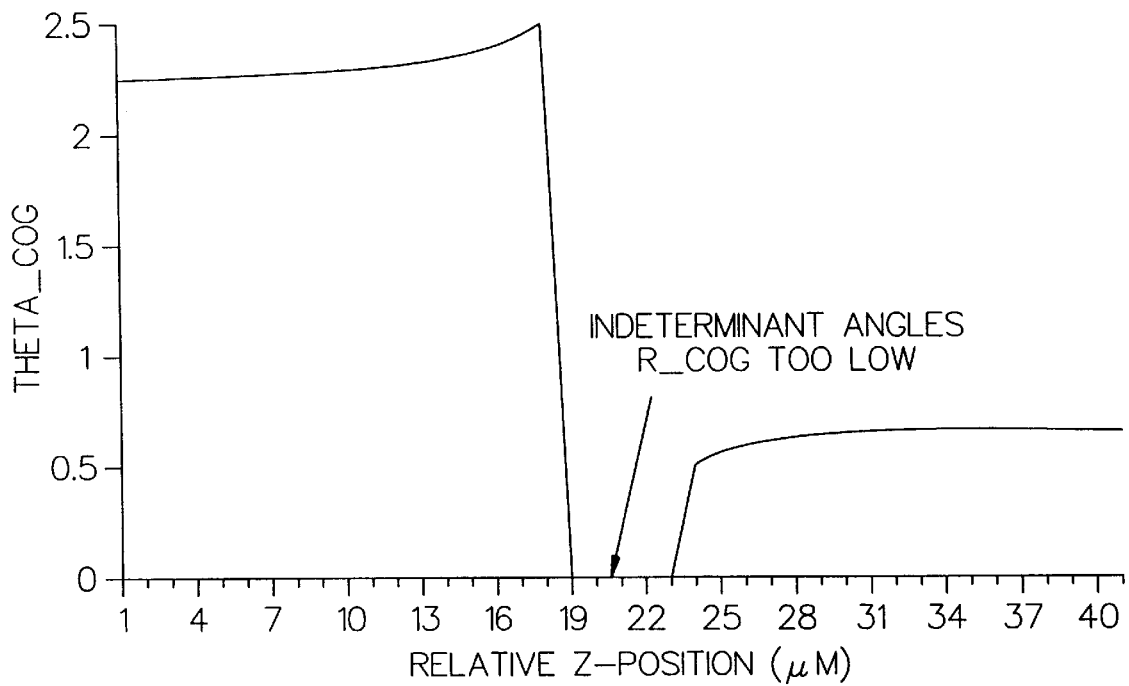
FIG. 13 shows a plot of the angle of the center of gravity versus Z coordinate.

Any image with a large value of r_COG_norm(Z) is the product of an eccentric point spread function, and the orientation of the major axis of the point spread function is θ_COG(Z). The value of r_COG_norm(Z) expresses the eccentricity, as the aspect ratio between the major and minor axes, of the point spread function. In the presence of astigmatism, given that the limits of the Z pan bracket the Z location of best focus, r_COG_norm(Z) will pass through a minimum near the middle of the Z pan at what is known as the Plane of Least Confusion, for which the point spread function is round; refer to FIG. 12. On either side of the Plane of Least Confusion, the value of r_COG_norm(Z) will rise, as the point spread function becomes eccentric. Furthermore, in the presence of astigmatism, the angle of the Center of Gravity vector, θ_COG(Z), resides at a first angle at the beginning of the Z pan, becomes indeterminate at the Plane of Least Confusion, and settles near the end of the Z pan at a second angle separated by approximately 90 degrees from the first angle; refer to FIG. 13. These first and second angles are called the Dominant Angles.

In step 128, the two dominant angles are found by first locating the null in the stored r_COG_norm(Z) curve. The null is the point where the value is at a local minimum and rises on either side. A first set of images is designated for the computation of the First Dominant Angle as that set of five adjacent images wherein the image nearest the null in the r_COG_norm(Z) curve resides five images below the null. Similarly, a second set of images is designated for the computation of the Second Dominant Angle as that set of five images wherein the image nearest the null in the r_COG_norm(Z) curve resides five images above the null. Each dominant angle is computed as the average of θ_COG(Z) for the five images in its designated image set.

In step 130, the values of the two dominant angles are used to look up the MAG(∅,Z) curve for their corresponding star pattern boundary angles. These curves were calculated and stored by repeated executions of steps 114 and 115. For each dominant angle, the corresponding boundary angle region is taken as the non-excluded boundary angle region nearest the dominant angle. The excluded boundaries are the vertical, horizontal and diagonal boundaries of the star pattern.

In step 132, the two selected MAG(∅,Z) curves are evaluated using curve fitting to find their peaks.

Figure 14:
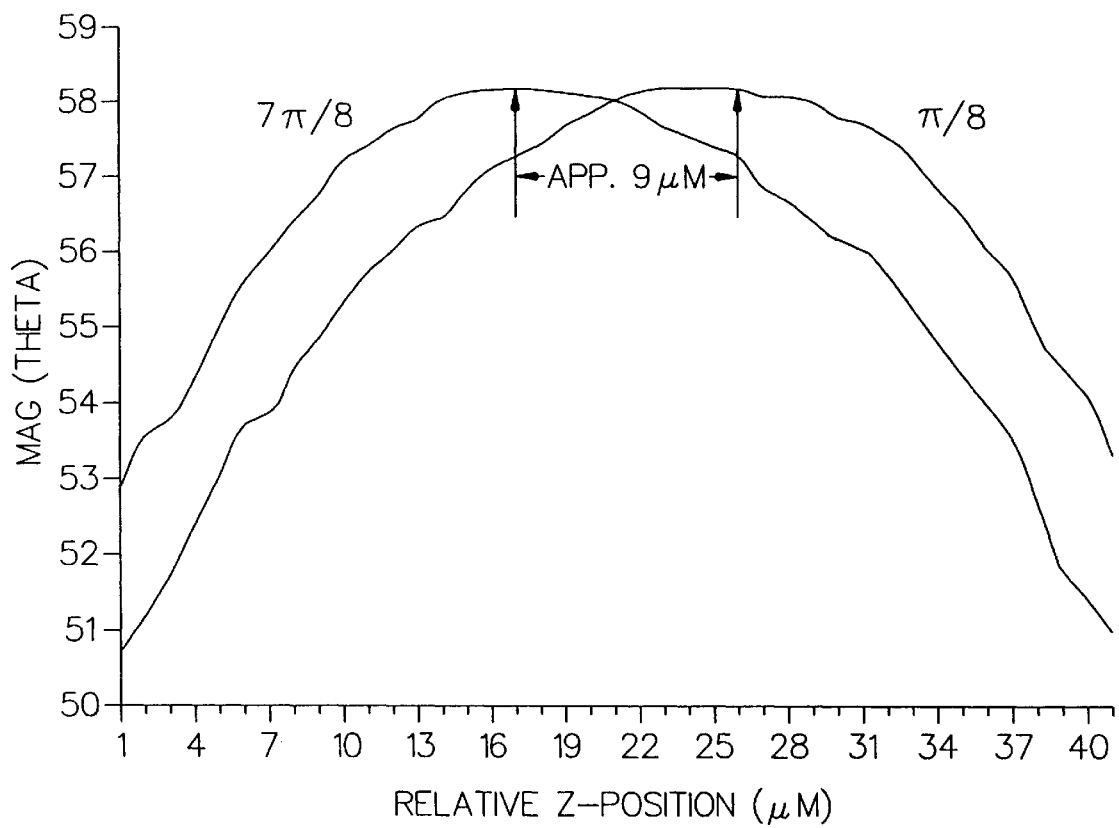
FIG. 14 shows a plot of MAG(z,θ) for two dominate angles.

FIG. 14 shows an example of mean residue values versus Z position plots for two dominant angles, π/8 and 7π/8. A separation of about 9 micrometers is noted between peaks of the mean residue.

Figure 15A:
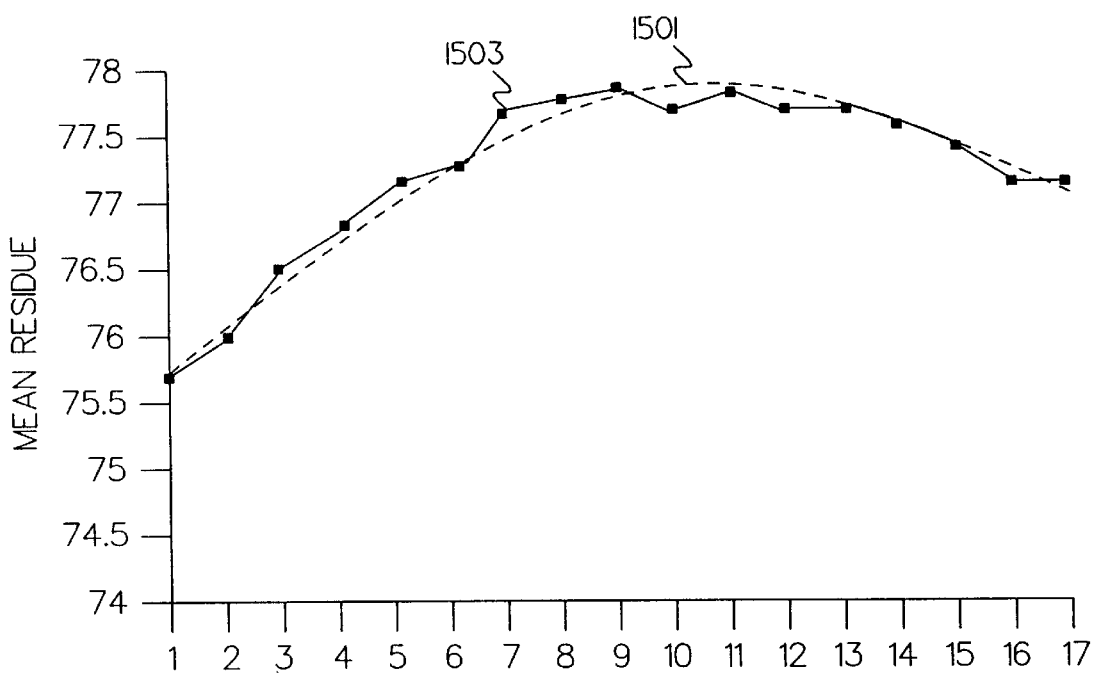
FIGS. 15A and 15B show curve fitting plots for two dominate angles.
Figure 15B:
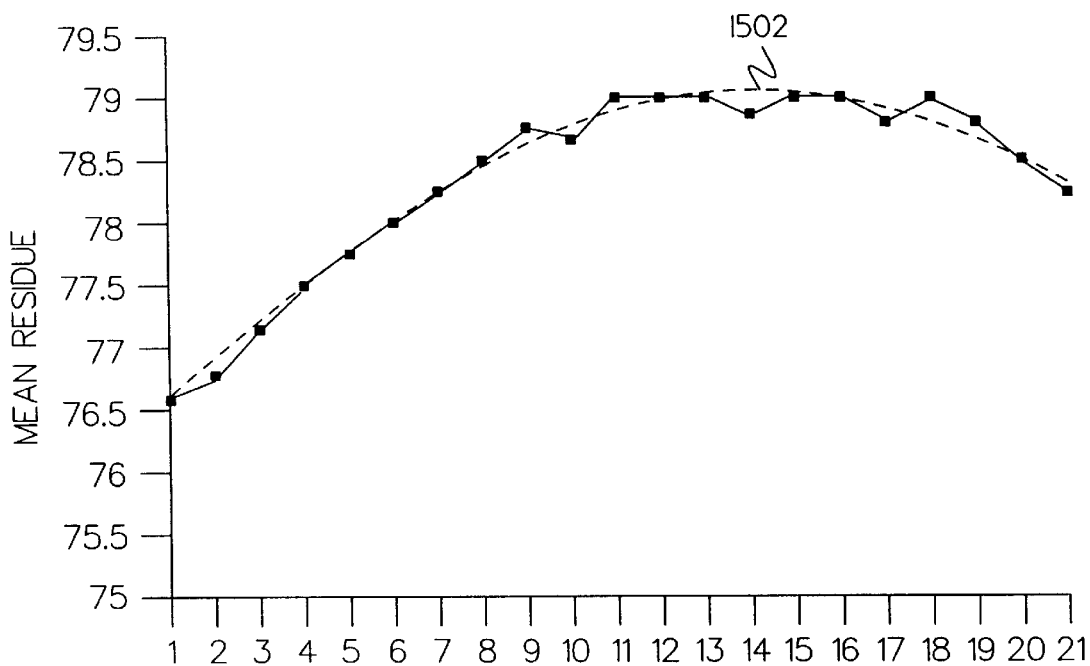

FIG. 15A and FIG. 15D show an example of an application of least-squares polynomial curve fitting to mean residue curves for two dominant angles. A quadratic is fit to each curve 1501, 1502, nominally using ten samples below the peak, ten samples above the peak, and the peak itself as the locus of points j to be fit. If the peak is too close to the end of the panning range to allow all 21 points to be used, the missing points are ignored and a fit using the remaining points in the set is performed. This is the case for the first dominant angle in this example, plot 1501, for which only 17 points 1503 were available for curve fitting.

Once the coefficients for the two quadratics have been calculated, a new peak is found for each curve by finding the location at which the first derivative of the quadratic is equal to zero. The differences between the peak locations computed in this way is reported as the Focal Plane Separation. This calculation, being based on a best fit to a set of points, carries precision much better than the 1 Z Pan increment precision that could have been delivered using just the original curve peaks. The quadratic equations for the two dominant angles are $$Mag_{ZF1}=a_1*Z^2+b_1*Z+c_1, \text{ and}$$

$$Mag_{ZF2}=a_2*Z^2+b_2*Z+c_2.$$

The two peak locations from curve fitting are $$Z_{pk1}=-\frac{b_1}{2*a_1},$$

and $$Z_{pk2}=-\frac{b_2}{2*a_2},$$

where $a_1$, $b_1$ and $c_1$ are the coefficients for the best-fit quadratic for Dominant Angle 1,
and $a_2$, $b_2$ and $c_2$ are the coefficients for the best-fit quadratic for Dominant Angle 2.
The Focal Plane Separation is reported in microns using the following relation 134:
$FPS=K_z*(Z_{pk2}-Zpk1)$
where $K_z$=scale factor in microns per z-pan increment.

In step 136, the focal plane separation is compared against a threshold. The system is given a "PASS" result if the separation is less than the threshold and a "FAIL" result if the separation exceeds the threshold. The threshold is established from empirical evidence about the effect of astigmatism on the performance of the optical system with considerations for the intended use of the system. Typically, the Focal Plane Separation will not be allowed to exceed 25% of the depth of field of the objective lens of the optical system.

Figure 16:
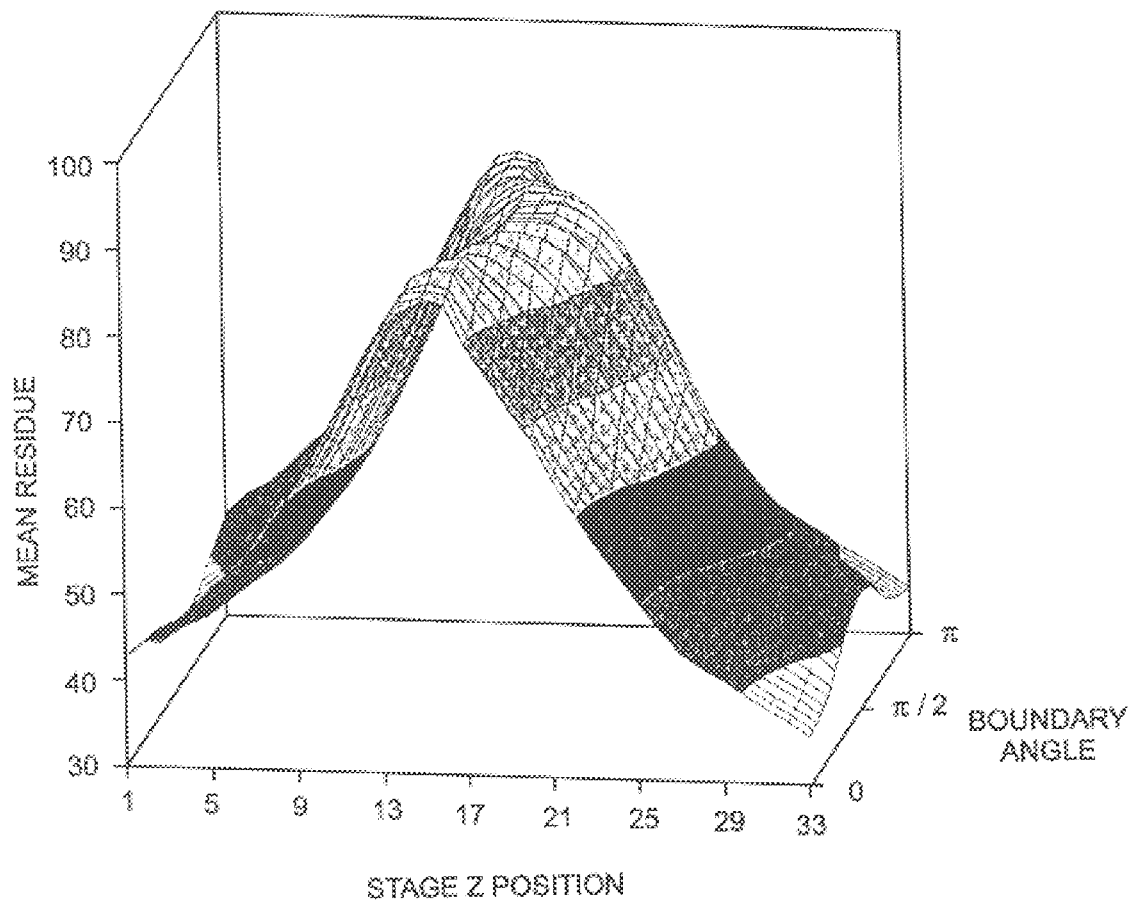
FIG. 16 shows a surface map of the mean residue as a function of stage elevation and test pattern boundary angle.

FIG. 16 is an example of a surface plot of mean residue versus boundary angle versus stage Z position. The first. dominant angle, θ_d1, resides at zero radians, which is identical to π radians, so that, as stage Z position increases, the residue contour first peaks at both ends of the boundary angle axis. The second dominant angle, θ_d2, resides at π/2, so that as stage Z position further increases, the residue contour peaks in the middle of the boundary angle axis. The Focal Plane Separation is equal to the difference in stage Z position between the peaks for the two dominant angles.

Now refer to FIGS. 17A, 17B and 17C which show a more detailed schematic diagram of one embodiment of the apparatus of the invention for measuring astigmatism in an image interpretation system integrated with a computer-driven microscope. The apparatus of the invention comprises an imaging system 502, a motion control system 504, an image processing system 536, a central processing system 540 and a workstation 542. The imaging system 502 is comprised of an illuminator 508, imaging optics 510, a CCD camera 512, an illumination sensor 514 and an image capture and focus system 516. The image capture and focus system 516 provides video timing data to the CCD cameras 512, the CCD cameras 512 provide images comprising scan lines to the image capture and focus system 516. An illumination sensor intensity is provided to the image capture and focus system 516 where an illumination sensor 514 receives the sample of the image from the optics 510. In one embodiment of the invention, the optics may further comprise an automated microscope. The illuminator 508 provides illumination of a slide. The image capture and focus system 516 provides data to a VME bus 538. The VME bus distributes the data to an image processing system 536. The image processing system 536 is comprised of field-of-view processors 568. The images are sent along the image bus 564 from the image capture and focus system 516. A central processor 540 controls the operation of the invention through the VME bus 538. In one embodiment the central processor 562 comprises a Motorola 68030 CPU. The motion controller 504 is comprised of a tray handler 518, a microscope stage controller 520, a microscope turret controller 522, and a calibration slide 524. The motor drivers 526 position the slide under the optics. A bar code reader 528 reads a barcode located on the slide 524. A touch sensor 530 determines whether a slide is under the microscope objectives, and a door interlock 532 prevents operation in case the doors are open. Motion controller 534 controls the motor drivers 526 in response to the central processor 540. An Ethernet (TM) communication system 560 communicates to EL workstation 542 to provide control of the system. A hard disk 544 is controlled by workstation 550. In one embodiment, workstation 550 may comprise a SUN SPARC CLASSIC (TM) workstation. A tape drive 546 is connected to the workstation processor 550 as well as a modem 548, a monitor 552, a keyboard 554, and a mouse pointing device 556. A printer 558 is connected to the Ethernet (TM) network 560.

During astigmatism testing, the central computer 540, running a real time operating system, controls the automated microscope and the processor to acquire and digitize images from the microscope. The flatness of the slide may be checked, for example, by contacting the four corners of the slide using a computer controlled touch sensor. The computer 540 also controls the microscope stage to position the specimen under the microscope objective, and from one to 15 field of view (FOV) processors 568 which receive images under control of the computer 540.

Refer now to FIG. 17C, FIG. 17C shows the placement of a calibration slide 1 into an optical path of an automated microscope 3 having a turret 23. The slide may be mounted on a stage 521 substantially in a horizontal X,Y plane which intersects the optical path. The stage 521 is movable in the X,Y plane as well as along a Z axis which is perpendicular to the X,Y plane and which is parallel to the optical axis of the automated microscope. The turret 23 may comprise multiple objective lenses as is well known in the art. The microscope turret control 522 provides signals in a well known manner for positioning a selected objective lens into position for viewing a slide, for example.

It is to be understood that the various processes described herein may be implemented in software suitable for running on a digital processor. The software may be embedded, for example, in the central processor 540.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. An apparatus for measurement of astigmatism of an optical system comprising:
   (a) means for focusing the optical system on a test pattern to form a test pattern image;

(b) means for obtaining a digital representation of the test pattern image formed by the optical system;

(c) means, responsive to the digital representation of the test pattern image, for computing a focal plane separation; and (d) means, responsive to the focal plane separation, for computing astigmatism of the optical system.

2. The apparatus of claim 1 wherein the means for computing a focal plane separation further comprises a computer processor.

3. The apparatus of claim 1 wherein the means for computing astigmatism further comprises a computer processor.

4. The apparatus of claim 1 wherein the means for computing a focal plane separation further comprises a means, responsive to the digital representation of the test pattern, for computing a plurality of center of gravity vectors.

5. The apparatus of claim 4 further comprising a means, responsive to the plurality of center of gravity vectors, for calculating an eccentricity of a point spread function from the plurality of center of gravity vectors, having an eccentricity output.

6. The apparatus of claim 5 further comprising:

(a) means, responsive to the plurality of center of gravity vectors, for calculating a first parameter, r_COG_norm, and having a first parameter output, by dividing a value of one of the plurality of center of gravity vectors, r_COG, for each image in a Z panning sequence by a mean resolution, mean_res, for that image to yield a normalized value for eccentricity according to $$r\_COG\_norm = r\_COG/mean\_res;$$

(b) means, responsive to the first parameter for calculating a second parameter, Sum_r_COG_norm, and having a second parameter output, as a summation of r_COG_norm over all images in the Z panning sequence according to $$Sum\_r\_COG\_norm = \sum_{z=1}^{n} r\_COG\_norm(z);$$

(c) means, responsive to the second parameter for relating a high value of Sum_r_COG_norm to the eccentricity in the point spread function.

7. The apparatus of claim 6 further comprising a means, responsive to the second parameter for computing a PASS/FAIL threshold for Sum_r_COG_norm by measuring astigmatism of lens systems with known astigmatism.

8. The apparatus of claim 1 further including a means for finding a focus range comprising:

(a) means for determining vertical motion limits for a Z panning sequence through a Z panning range by obtaining a plurality of focus images;

(b) means, responsive to the plurality of focus images, for computing a resolution measure for each of the plurality of focus images, having a resolution measure output; and (c) means, responsive to the resolution measure output, for determining a vertical position yielding a best overall resolution for a middle position of the Z panning range, having a vertical position output.

9. The apparatus of claim 1, wherein the optical system includes a stage with a stage elevation, wherein the means for acquiring a plurality of images acquires the plurality of images, beginning at a lower limit of the stage elevation, passing through a plane of best focus, and extending to an upper limit of the stage elevation.

10. The apparatus of claim 1 further comprising:

(a) means, connected to the plurality of images output, for edge enhancing the plurality of images in a first direction, having an edge enhanced output; and (b) means, connected to the edge enhanced output, for lowpass filtering the plurality of images in a second direction wherein the first direction is orthogonal to the second direction to substantially equalize the plurality of images.

11. The apparatus of claim 1 wherein the means for computing a focal plane separation comprises:

(a) means for computing a first derivative of one of the plurality of images, to convey a location and a sharpness of boundaries in one of the plurality of images, having a first derivative output;

(b) means, responsive to the first derivative output, for summing derivative values for each pixel belonging to a given boundary and placing a resultant summation into an array indexed by boundary angle, so as to build the array indexed by boundary angle with a plurality of summed derivatives, having a summed derivative output; and (c) means, responsive to the summed derivative output, for using the plurality of summed derivatives from the array to compute a center of gravity vector.

12. The apparatus of claim 1 wherein the means for computing a focal plane separation from a plurality of filtered test pattern images further comprises:

(a) means for summing a magnitude of a center of gravity vector over the plurality of filtered test pattern images from a Z panning sequence to provide a summation of the magnitude of the center of gravity vector; and (b) means, responsive to the summation of the magnitude of the center of gravity vector, for comparing the summation of the magnitude of the center of gravity vector against a threshold as a first estimate of a severity of astigmatism.

13. The apparatus of claim 12 wherein the threshold is an empirically derived fraction of mean residue values integrated over all boundaries in the plurality of images in the Z panning sequence.

14. The apparatus of claim 12 further comprising a means for determining a magnitude of a center of gravity vector for the plurality of filtered test pattern images, wherein the means for determining a magnitude of a center of gravity vector comprises:

(a) means for initially centering a test pattern, having a centered test pattern output;

(b) means, responsive to the centered test pattern output, for finding an exact center of the test pattern to align test pattern objects with preassigned bins, having an exact center output;

(c) means, responsive to the exact center output, for computing a plurality of X-Gradients and a plurality of Y-Gradients for each filtered test pattern image to produce a plurality of gradient image pixels;

(d) means, responsive to the plurality of gradient image pixels, for sorting the plurality of gradient image pixels into bins by boundary angle, having a binned output;

(e) means, responsive to the binned output, for rejecting each one of the plurality of gradient image pixels outside a predetermined region, having a regional output;

(f) means, responsive to the regional output, for rejecting each one of the plurality of gradient image pixels with low gradient scores, having a filtered output;

(g) means, responsive to the filtered output, for squaring each one of the plurality of gradient image pixels to produce a plurality of squared gradient values;

(h) means, responsive to the plurality of squared gradient values, for summing squares of the plurality of X_gradients and the plurality of Y_gradients to produce a sum of squares;

(i) means, responsive to the sum of squares, for checking the sum of squares against a threshold, having a thresholded output;

(j) means, responsive to the thresholded output, for adding the plurality of squared gradient values to a bin for each gradient image pixel's boundary angle, if threshold requirement is met, having a summed output;

(k) means, responsive to the summed output, for computing a mean residue for each boundary angle to produce a mean residue result;

(l) means, responsive to the mean residue result, for normalizing the mean residue result by dividing by an average number of pixels per bin, having a normalized output;

(m) means, responsive to the normalized output, for computing a third array by taking a quadratic sum of the plurality of X_Gradients and Y_Gradients, having a third array output; and (n) means, responsive to the third array output, for computing the magnitude of the center of gravity vector from the third array.

15. The apparatus of claim 14 wherein the means for computing the magnitude of the center of gravity vector further comprises a means for computing the following operators, $$M_X = \sum_{\phi=0}^{\pi} [\cos(2\phi)*MAG(\phi)],$$

$$M_Y = \sum_{\phi=0}^{\pi} [\sin(2\phi)*MAG(\phi)], \text{ and}$$

$$r\_COG = \sqrt{M_X^2 + M_Y^2},$$

where $MAG0(\emptyset)$ is: the residue value.

16. The apparatus of claim 14 further comprising means for computing the following operators, $$Grad_X[i,j]=ABS(A[i+1][j]-A[i][j]), \text{ and}$$

$$Grad_Y[i,j]=ABS(A[i][j+1]-A[i][j]),$$

$$SUM_X[\emptyset]=\Sigma Grad^{Xij2}$$

where pixels [i,j] lie on the boundary at angle ø, $$SUM_Y[\emptyset]=\Sigma Grad^{Yij2}$$

where pixels [i,j] lie on the boundary at angle ø.

17. The apparatus of claim 12 further comprising a means for computing an angle of a center of gravity vector, wherein the means for computing the angle of a center of gravity vector comprises a means for computing the following operator, $$\theta\_COG = \frac{\arctan\left[\frac{M_Y}{M_X}\right]}{2}.$$

18. The apparatus of claim 1 further comprising a means for initially centering the test pattern image during system calibration and a means for storing an initial center location of the test pattern.

19. The apparatus of claim 18 further comprising means for determining an exact center of the test pattern from the initial center location of the test pattern by morphological operations.

20. The apparatus of claim 1 wherein the means for computing a focal plane separation further comprises:

(a) means for finding a first dominant angle for a first focal plane, having a first dominant angle output;

(b) means for finding a second dominant angle for a second focal plane, having a second dominant angle output; and (c) means, responsive to the first dominant angle output and the second dominant angle output, for computing the focal plane separation of the first focal plane from the second focal plane to generate a focal plane separation.

21. The apparatus of claim 20 further comprising:

(a) means for locating a plane of least confusion by finding an image in a Z panning sequence yielding a least value of a magnitude of a center of gravity vector, having a plane of least confusion output;

(b) means, responsive to the plane of least confusion output, for computing an angle of the center of gravity vector for an image offset below the plane of least confusion to yield a first dominant angle; and (c) means, responsive to the plane of least confusion output, for computing the angle of the center of gravity vector for an image offset above the plane of least confusion to yield a second dominant angle.

22. The apparatus of claim 20 further comprising:

(a) means for finding a first Z panning position with a highest resolution for the first dominant angle, having a first Z panning position output;

(b) means for finding a second Z panning position with the highest resolution for the second dominant angle, having a second Z panning position output; and (c) means, responsive to the first Z panning position output and the second Z panning position output, for computing an absolute value of a difference between the first Z panning position and the second Z panning position.

23. The apparatus of claim 1 wherein the means for focusing the optical system on a test pattern has a focus control input responsive to the computed astigmatism of the optical system.

24. An apparatus for measurement of astigmatism of an optical train having an objective lens, the apparatus comprising:

(a) an optical mount to hold the optical train;

(b) an optical stage to hold a test pattern in view of the objective lens wherein the objective lens receives an image of the test pattern and transmits a test pattern image;

(c) a stage drive attached to move the optical stage, wherein the optical stage drive has a focus control input;

(d) a computer processor responsive to control the stage drive;

(e) a test pattern illuminator disposed to illuminate the test pattern;

(f) a video camera for receiving the test pattern image and generating a video signal;

(g) image acquisition electronics responsive to the video signal, having a digital image output; and (h) an image analysis computer responsive to the digital image output including means for analyzing a plurality of test pattern images to measure a focal plane separation and means for computing astigmatism of the optical train responsive to the focal plane separation.

25. The apparatus of claim 24 wherein the test pattern illuminator further comprises a light and a condenser lens.

26. The apparatus of claim 24 further comprising a microscope in the optical train, the microscope including an output converted to an electronically stored image.

27. The apparatus of claim 24 wherein the test pattern is a star pattern.

28. The apparatus of claim 24 further comprising an image interpretation system and a computer driven microscope.

29. A method for measurement of astigmatism of an optical system comprising the steps of:

(a) focusing the optical system on a test pattern to form a test pattern image;

(b) obtaining a digital representation of the test pattern image formed by the optical system;

(c) computing a focal plane separation based on the digital representation of the test pattern image; and (d) computing astigmatism of the optical system based on the focal plane separation.

30. The method of claim 29 wherein the step of computing a focal place separation further comprises computing a plurality of center of gravity vectors based on the digital representation of the test pattern.

31. The method of claim 30 further comprising the step of calculating an eccentricity of a point spread function based on the plurality of center of gravity vectors.

32. The method of claim 31 further comprising the steps of:

(a) calculating a first parameter, r_COG_norm, and having a first parameter output, by dividing a value of one of the plurality of center of gravity vectors, r_COG, for each image in a Z panning sequence by a mean resolution, mean_res, for that image to yield a normalized value for eccentricity according to $$r\_COG\_norm = r\_COG/mean\_res;$$

(b) calculating a second parameter, Sum_r_COG_norm, and having a second parameter output, as a summation of r_COG_norm over all images in the Z panning sequence according to $$Sum\_r\_COG\_norm = \sum_{z=1}^{n} r\_COG\_norm(z);$$

(c) relating a high value of Sum_r_COG_norm to the eccentricity in the point spread function.

33. The method of claim 32 further comprising the step of computing a PASS/FAIL threshold for Sum_r_COG_ norm by measuring astigmatism of lens systems with known astigmatism.

34. The method of claim 33 further comprising the step of finding a focus range.

35. The method of claim 34 wherein the step of finding a focus range further comprises the steps of:

(a) determining vertical motion limits for a Z panning sequence through a Z panning range by obtaining a plurality of focus images;

b) computing a resolution measure for each of the plurality of focus images, having a resolution measure output; and (c) determining a vertical position yielding a best overall resolution for a middle position of the Z panning range, having a vertical position output.

36. The method of claim 29, wherein the optical system further includes a stage with a stage elevation, further comprising the step of acquiring a plurality of images, beginning at a lower limit of the stage elevation, passing through a plane of best focus, and extending to an upper limit of the stage elevation.

37. The method of claim 29 further comprising the steps of:

(a) edge enhancing the plurality of images in a first direction, having an edge enhanced output; and (b) lowpass filtering the plurality of images in a second direction wherein the step of first direction is orthogonal to the second direction to substantially equalize the plurality of images.

38. The method of claim 29 wherein the step of computing a focal plane separation further comprises the steps of:

(a) computing a first derivative of one of the plurality of images, to convey a location and a sharpness of boundaries in one of the plurality of images, having a first derivative output;

(b) summing derivative values for each pixel belonging to a given boundary and placing a resultant summation into an array indexed by boundary angle, so as to build the array indexed by boundary angle with a plurality of summed derivatives, having a summed derivative output; and (c) using the plurality of summed derivatives from the array to compute a center of gravity vector.

39. The method of claim 29 wherein the step of computing a focal plane separation further comprises the steps of:

(a) summing a magnitude of a center of gravity vector over a plurality of filtered test pattern images from a Z panning sequence to provide a summation of the magnitude of the center of gravity vector; and (b) comparing the summation of the magnitude of the center of gravity vector against a threshold as a first estimate of a severity of astigmatism.

40. The method of claim 39 wherein the threshold is an empirically derived fraction of mean residue values integrated over all boundaries in the plurality of images in the Z panning sequence.

41. The method of claim 39 further comprising the step of determining the magnitude of a center of gravity vector for the plurality of filtered test pattern images, wherein the step of determining the magnitude of a center of gravity vector for the plurality of filtered test pattern images further comprises the steps of:

(a) initially centering a test pattern, having a centered test pattern output;

(b) finding an exact center of the test pattern to align test pattern objects with preassigned bins, having an exact center output;

(c) computing a plurality of X-Gradients and a plurality of Y-Gradients for each filtered test pattern image to produce a plurality of gradient image pixels;

(d) sorting the plurality of gradient image pixels into bins by boundary angle, having a binned output;

(e) rejecting each one of the plurality of gradient image pixels outside a predetermined region, having a regional output;

(f) rejecting each one of the plurality of gradient image pixels from the regional output with low gradient scores, having a filtered output;

(g) squaring each one of the plurality of gradient image pixels from the filtered output to produce a plurality of squared gradient values;

(h) summing squares of the plurality of X_gradients and the plurality of Y_gradients to produce a sum of squares;

(i) checking the sum of squares against a threshold, having a thresholded output;

(j) adding the plurality of squared gradient values to a bin for each gradient image pixel's boundary angle, if threshold requirement is met, having a summed output;

(k) computing a mean residue for each boundary angle to produce a mean residue result;

(l) normalizing the mean residue result by dividing by an average number of pixels per bin, having a normalized output;

(m) computing a third array by taking a quadratic sum of the plurality of X_Gradients and Y_Gradients, having a third array output; and (n) computing the magnitude of the center of gravity vector from the third array output.

42. The method of claim 41 wherein the step of computing the magnitude of the center of gravity vector further comprises computing the following operators, $$M_X = \sum_{\phi=0}^{\pi} [\cos(2\phi)*MAG(\phi)],$$

$$M_Y = \sum_{\phi=0}^{\pi} [\sin(2\phi)*MAG(\phi)], \text{ and}$$

$$r\_COG = \sqrt{M_X^2 - M_Y^2},$$

where MAG(ø) is the residue value.

43. The method of claim 41 farther comprising computing the following operators, $$Grad_x[i,j] = ABS(A[i+1][j]-A[i][]),$$

$$Grad_y[i,j] = ABS(A[i][j+1]-A[i][j])$$

where pixels [i,j] lie on the boundary at angle ø, and $$SUM_x[\phi] = \Sigma Grad_{x_{ij}}^2$$

where pixels [i,j] lie on the boundary at angle ø.

44. The method of claim 41 further comprising the step of computing an angle of a center of gravity vector, wherein the step of computing the angle of a center of gravity vector comprises computing the following operator, $$\theta\_COG = \frac{\arctan\left[\frac{M_Y}{M_X}\right]}{2}.$$

45. The method of claim 29 further comprising the step of initially centering the test pattern image during system calibration and storing an initial center location of the test pattern.

46. The method of claim 45 further comprising the step of determining an exact center of the test pattern from the initial center location of the test pattern using morphological operations.

47. The method of claim 29 wherein the step of computing a focal plane separation further comprises the steps of:

(a) finding a first dominant angle for a first focal plane, having a first dominant angle output;

(b) finding a second dominant angle for a second focal plane, having a second dominant angle output; and (c) means, responsive to the first dominant angle output and the second dominant angle output, for computing the focal plane separation of the first focal plane from the second focal plane to generate a focal plane separation.

48. The method of claim 47 further comprising:

(a) locating a plane of least confusion by finding an image in a Z panning sequence yielding a least value of a magnitude of a center of gravity vector, having a plane of least confusion output;

(b) computing an angle of the center of gravity vector for an image offset below the plane of least confusion to yield a first dominant angle; and (c) computing the angle of the center of gravity vector for an image offset above the plane of least confusion to yield a second dominant angle.

49. The method of claim 48 further comprising the step of finding a separation of focal planes.

50. The method of claim 49 wherein the step of finding a separation of focal planes further comprises the steps of:

(a) finding a first Z panning position with a highest resolution for the first dominant angle, having a first Z panning position output;

(b) finding a second Z panning position with the highest resolution for the second dominant angle, having a second Z panning position output; and (c) computing an absolute value of a difference between the first Z panning position and the second Z panning position.

51. The method of claim 29 further comprising the step of focusing the optical system on a test pattern in response to the computed astigmatism of the optical system.

* * * * *